US008918596B2

(12) United States Patent
Dice et al.

(10) Patent No.: US 8,918,596 B2
(45) Date of Patent: Dec. 23, 2014

(54) SYSTEM AND METHOD FOR IMPLEMENTING NUMA-AWARE STATISTICS COUNTERS

(71) Applicant: Oracle International Corporation, Redwood City, CA (US)

(72) Inventors: David Dice, Foxboro, MA (US); Yosef Lev, New York, NY (US); Mark S. Moir, Wellington (NZ)

(73) Assignee: Oracle International Corporation, Redwood City, CA (US)

( * ) Notice: Subject to any disclaimer, the term of this patent is extended or adjusted under 35 U.S.C. 154(b) by 179 days.

(21) Appl. No.: 13/722,817

(22) Filed: Dec. 20, 2012

(65) Prior Publication Data

US 2014/0181423 A1 Jun. 26, 2014

(51) Int. Cl.
*G06F 13/18* (2006.01)
*G06F 9/50* (2006.01)
*G06F 9/52* (2006.01)

(52) U.S. Cl.
CPC .............. *G06F 13/18* (2013.01); *G06F 9/5027* (2013.01); *G06F 9/52* (2013.01); *G06F 9/526* (2013.01)
USPC ............................ 711/151; 711/156; 711/158

(58) Field of Classification Search
CPC ......... G06F 13/18; G06F 9/52; G06F 9/9526; G06F 9/5027
USPC .......................................... 711/151, 156, 158
See application file for complete search history.

(56) References Cited

U.S. PATENT DOCUMENTS

| | | | |
|---|---|---|---|
| 6,940,852 B1 | 9/2005 | Washburn | |
| 7,366,961 B1 * | 4/2008 | Kovacevic et al. | 714/701 |
| 7,765,214 B2 | 7/2010 | Altevogt et al. | |
| 7,853,937 B2 * | 12/2010 | Janczewski | 717/149 |
| 8,151,008 B2 * | 4/2012 | Simon et al. | 710/6 |
| 8,386,720 B2 * | 2/2013 | Inagaki et al. | 711/152 |
| 8,464,217 B2 * | 6/2013 | Janczewski | 717/116 |
| 2003/0188300 A1 * | 10/2003 | Patrudu | 717/149 |
| 2007/0294494 A1 * | 12/2007 | Conti et al. | 711/158 |
| 2007/0294512 A1 * | 12/2007 | Crutchfield et al. | 712/200 |

(Continued)

OTHER PUBLICATIONS

International Search Report and Written Opinion from PCT/US2013/076509, mailed May 9, 2014, Oracle International Corporation, pp. 1-11.

(Continued)

*Primary Examiner* — Stephen Elmore
(74) *Attorney, Agent, or Firm* — Robert C. Kowert; Meyertons, Hood, Kivlin, Kowert & Goetzel, P.C.

(57) ABSTRACT

The systems and methods described herein may be used to implement scalable statistics counters suitable for use in systems that employ a NUMA style memory architecture. The counters may be implemented as data structures that include a count value portion and a node identifier portion. The counters may be accessible within transactions. The node identifier portion may identify a node on which a thread that most recently incremented the counter was executing or one on which a thread that has requested priority to increment the shared counter was executing. Threads executing on identified nodes may have higher priority to increment the counter than other threads. Threads executing on other nodes may delay their attempts to increment the counter, thus encouraging consecutive updates from threads on a single node. Impatient threads may attempt to update the node identifier portion or may update an anti-starvation variable to indicate a request for priority.

20 Claims, 15 Drawing Sheets

(56) References Cited

U.S. PATENT DOCUMENTS

| | | | | |
|---|---|---|---|---|
| 2007/0294663 | A1* | 12/2007 | McGuire et al. | 717/108 |
| 2007/0294665 | A1* | 12/2007 | Papakipos et al. | 717/119 |
| 2007/0294666 | A1* | 12/2007 | Papakipos et al. | 717/119 |
| 2007/0294671 | A1* | 12/2007 | Demetriou et al. | 717/124 |
| 2007/0294680 | A1* | 12/2007 | Papakipos et al. | 717/149 |
| 2007/0294681 | A1* | 12/2007 | Tuck et al. | 717/149 |
| 2007/0294682 | A1* | 12/2007 | Demetriou et al. | 717/153 |
| 2008/0288663 | A1* | 11/2008 | Kovacevic et al. | 710/5 |
| 2011/0239299 | A1 | 9/2011 | Chen et al. | |
| 2012/0173786 | A1* | 7/2012 | Simon et al. | 710/308 |
| 2014/0019664 | A1* | 1/2014 | Simon et al. | 710/308 |
| 2014/0040526 | A1* | 2/2014 | Chang et al. | 710/316 |

OTHER PUBLICATIONS

"The Performance of Spin Lock Alternatives for Shared-Memory Multiprocessors", Thomas E. Anderson, IEEE Transactions on Parallel and Distributed Systems, vol. 1, No. 1, Jan. 1990, pp. 1-11.

"Scalable Statistics Counters", Dave Dice, et al., 2013, pp. 1-10.

"Hierarchical Backoff Locks for Nonuniform Communication Architectures", Zoran Radovic and Erik Hagersten, Proceedings of the Ninth International Symposium on High-Performance Computer Architecutre, 2002, pp. 1-12.

"A Practical Nonblocking Queue Algorithm Using Compare-and-Swap", Chien-Hua Shann, et al., 2002, pp. 470-475.

A. Agarwal and M. Cherian. Adaptive backoff synchronization techniques. In Proceedings of the 16th annual international symposium on Computer architecture, ISCA '89, pp. 396-406, New York, NY, USA, 1989. ACM.

M. Csűrös. Approximate counting with a floating-point counter. In Proceedings of the 16th annual international conference on Computing and combinatorics, COCOON'10, pp. 358-367, Berlin, Heidelberg, 2010.

D. Dice and A. Garthwaite. Mostly lock-free malloc. In Proceedings of the 3rd international symposium on Memory management, ISMM '02, pp. 163-174, New York, NY, USA, 2002. ACM.

D. Dice, V. J. Marathe, and N. Shavit. Lock cohorting: a general technique for designing numa locks. In Proceedings of the 17th ACM SIGPLAN symposium on Principles and Practice of Parallel Programming, PPoPP '12, pp. 247-256, New York, NY, USA, 2012. ACM.

P. Flajolet. Approximate counting: a detailed analysis. BIT, 25(1):113-134, Jun. 1985.

Y. Lev and M. Moir. Lightweight parallel accumulators using c++ templates. In Proceedings of the 4th International Workshop on Multicore Software Engineering, IWMSE '11, pp. 33-40, New York, NY, USA, 2011. ACM.

R. Morris. Counting large numbers of events in small registers. Commun. ACM, 21(10):840-842, Oct. 1978.

Z. Radovic and E. Hagersten. Hierarchical backoff locks for nonuniform communication architectures. In Proceedings of the 9th International Symposium on High-Performance Computer Architecture, HPCA '03, pp. 241-252, Washington, DC, USA, 2003. IEEE Computer Society.

U.S. Appl. No. 13/722,839, filed Dec. 20 2012, David Dice et al.
U.S. Appl. No. 13/722,811, filed Dec. 20 2012, David Dice et al.

* cited by examiner

SYSTEM AND METHOD FOR IMPLEMENTING NUMA-AWARE STATISTICS COUNTERS

BACKGROUND

1. Field of the Disclosure

This disclosure relates to shared statistics counters, and more specifically to techniques for improving the performance of applications that include accesses to shared statistics counters.

2. Description of the Related Art

Current trends in multicore architecture design imply that in coming years, there will be an accelerated shift away from simple bus-based designs towards distributed non-uniform memory-access (NUMA) and cache-coherent NUMA (CC-NUMA) architectures. Under NUMA, the memory access time for any given access depends on the location of the accessed memory relative to the processor. Such architectures typically consist of collections of computing cores with fast local memory (e.g., memory that is closely coupled to the processor and/or that is located on the same single multicore chip), communicating with each other via a slower (inter-chip) communication medium. In such systems, the processor can typically access its own local memory, such as its own cache memory, faster than non-local memory. In some systems, the non-local memory may include one or more banks of memory shared between processors and/or memory that is local to another processor. Some systems, including many NUMA systems, provide a non-uniform communication architecture (NUCA) property, in which the access time to caches of other processor cores varies with their physical distance from the requesting core. In these systems, access by a core to its local memory, and in particular to a shared local cache, can be several (or many) times faster than access to a remote memory (e.g., a cache located on another chip).

Most large software systems use statistics counters for performance monitoring and diagnostics. For example, statistics counters are of practical importance for purposes such as detecting excessively high rates of various system events, or for mechanisms that adapt based on event frequency. While single-threaded statistics counters are trivial, commonly-used naïve concurrent implementations quickly become problematic, especially as thread counts grow. For example, as systems grow and as statistics counters are used in increasingly Non-Uniform Memory Access (NUMA) systems, commonly used naïve counters impose scalability bottlenecks and/or such inaccuracy that they are not useful. In particular, these counters (when shared between threads) can incur invalidation traffic on every modification of the counter, which is especially costly on NUMA machines.

The ability to execute transactions in parallel is a key to scalable performance. However, the use of shared counters for collecting statistics (e.g., statistics on how often a piece of code is executed, how many elements are in a hash table, etc.) can negatively impact transactional success rates when accesses to the counters occur within transactions (since any two updates to a shared counter by different transactions or threads will potentially conflict with each other). Some previous approaches to solving this problem involve moving the operations that update the counter outside of the transactions, thereby changing the semantics of the program, or implementing complicated and expensive support for "transactional boosting", which is not applicable in all contexts.

For these and other reasons, application designers face difficult tradeoffs involving the latency imposed on lightly contended counters, the scalability and (in some cases) accuracy of heavily contended counters, and various probe effects.

SUMMARY

The systems and methods described herein may in various embodiments be used to implement scalable statistics counters. In some embodiments, the use of these counters, rather than standard counters, may improve performance for applications executing in systems that employ a NUMA style memory architecture and/or that exhibit NUCA properties. As used herein, the terms "NUMA" and "NUMA style memory architecture" may be used in reference to any systems that exhibit NUMA and/or NUCA properties. In some embodiments, the counters may be implemented as data structures that include a count value portion and a node identifier portion. The node identifier portion may identify a node on which a thread that most recently incremented the counter was executing or one on which a thread that has requested priority to increment the shared counter was executing. Threads executing on a node identified by the node identifier portion of the counter data structure may have higher priority to increment the counter than other threads. In some embodiments, threads executing on nodes other than the one identified by the node identifier portion of the counter data structure may delay their attempts to increment the counter before retrying them. This may encourage consecutive updates from threads on a single node, thus reducing cache misses and improving overall performance. In some embodiments, impatient threads may attempt to update the node identifier portion of the data structure, or may update a separate anti-starvation variable (e.g., by writing an identifier of the node on which they are executing) to indicate a request for priority to increment the shared counter.

In some embodiments, the systems and methods described herein may implement probabilistic counters. As described in more detail herein, in various embodiments, these probabilistic counters may directly store update probability values or may store other types of probabilistic counter values (e.g., they may store one or more values that represent an update probability and/or a projected counter value or from which an update probability and/or a projected counter value may be computed). In some embodiments, the implementations of the counters and/or their update mechanisms may be dependent on the value of a configurable accuracy parameter. In such embodiments, the configurable accuracy parameter value may be adjusted to provide fine-grained control over the tradeoff between the accuracy of the counters and the performance of the applications that access them. For example, the counters may be implemented as data structures that include a mantissa portion and an exponent portion that collectively represent an update probability value. As described in more detail herein, when updating the counters, the value of the configurable accuracy parameter may affect whether, when, how often, and/or by what amount the mantissa portion and/or the exponent portion are updated. In another example, updating a probabilistic counter may include multiplying its value by a constant that is dependent on the value of a configurable accuracy parameter.

In some embodiments, the systems and methods described herein may implement scalable statistics counters that are adaptive to the amount of contention for the counters by multiple threads of an application. For example, methods for determining whether to increment the counters in response to initiation of an increment operation and/or methods for updating the counters may be selected from among multiple available methods dependent on current, recent, or historical amounts of contention. In some embodiments, the counters may be accessible from within atomic transactions. In various embodiments, different contention management policies and/or retry conditions may be applied to select between multiple methods. For example, in some embodiments, the method for determining whether or how to update a shared counter may be changed dynamically (i.e., during execution) in response to an increase or decrease in contention for the counter (e.g., after a pre-determined maximum number of failed attempts to increment or update the counter using initial or default methods). In some embodiments, a shared counter may include a precise counter portion that is incremented under low contention and a probabilistic counter portion that is updated under high contention. In some embodiments, the amount by which a probabilistic counter is incremented may be contention-dependent. In other embodiments, a counter may include a node identifier portion that encourages consecutive increments by threads on a single node only when the counter is under contention. In still other embodiments, a relatively simple counter data structure may be inflated in response to contention for the counter, as described in more detail below.

Figure 1:
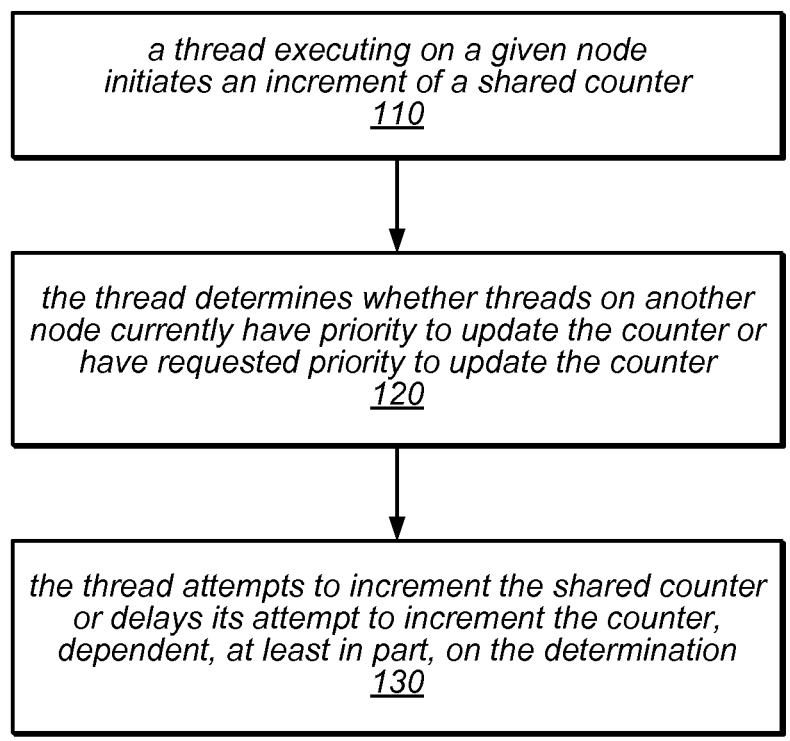
FIG. 1 is a flow diagram illustrating one embodiment of a method for implementing a NUMA-aware shared counter, as described herein.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As noted above, the use of statistics counters is very common in most large software systems. Accesses to shared statistics counters can be a source of contention between concurrent threads of a multithreaded application, including those that execute in systems that support hardware and/or software transactional memory. Multicore machines are growing in size, and accordingly shifting from simple bus-based designs to NUMA and CC-NUMA style memory architectures. With this shift, there is an increased need for scalable statistics counters. The system and methods described herein may in some embodiments be used to implement scalable statistics counters. In different embodiments, the scalable statistics counters described herein achieve this scalability by splitting a counter into multiple components, thereby reducing contention on each component, or by employing techniques by which the counter is updated less frequently. Both classes of techniques may significantly reduce conflicts between concurrently executing atomic transactions that use them, thus improving their chances of success and helping to achieve scalable performance.

In different embodiments, the techniques described herein may be used to implement precise and/or probabilistic (statistical) counters that are non-blocking and that provide dramatically better scalability and accuracy properties when compared to commonly used naïve counters. Although probabilistic counters may not provide an exact count, they may have statistical properties such that, with high probability, they do not deviate from the precise count by "too much", e.g., according to a configurable accuracy parameter. In some embodiments, the counters described herein may be competitive with the naïve counters even when contention is low. In general, the statistics counters described herein may be suitable for applications in which they are used to count events that are likely to occur with high frequency, while the value of the counter may be read infrequently, as is common for performance monitoring and diagnostics. While many of the counters described herein are assumed to be incremented only by one and never decremented, the techniques described herein may in other embodiments be generalized to weaken and/or avoid these assumptions.

In some embodiments, the techniques described herein may encourage multiple consecutive increments of a contended statistics counter on one node of a NUMA system before counter updates occur on another. Avoiding cross-node communication between these consecutive updates may in some embodiments dramatically reduce expensive communication traffic between NUMA nodes, thus improving throughput and scalability. In some embodiments, these techniques may provide accurate statistics counters that scale better than commonly used naïve approaches, while adding little or no space overhead.

In general, simply incrementing a shared counter without synchronization does not work well in multithreaded applications, because an update by one thread may be overwritten by an update by another thread, thereby losing the effects of one or more increments on the counter. In some cases, such counters can be made thread-safe by protecting them with a lock. However, in most modern shared memory multiprocessors, it may be better to increment the counter using an atomic instruction such as compare-and-swap (CAS) type instruction. If a CAS type instruction is used to increment the counter, it will indicate success only if the counter holds the value the incrementing thread expected to see prior to incrementing it and the operation succeeds in updating the counter value. Otherwise, the increment operation may be retried, perhaps after some back-off period. This solution is simple, correct, and non-blocking, but it does not scale to larger and increasingly NUMA systems. Using a single-threaded increment operation (e.g., using separate load and store instructions to update the counter) to eliminate the overhead of a CAS type instruction and reduce the latency (e.g., when knowing the precise value of the counter is not required) does not avoid the dominant cost of resolving the remote cache misses that are likely to occur when a variable is modified by many threads in a NUMA system. In addition, this approach does not merely result in the occasional loss of updates when under contention, but has been shown to result in the loss of the vast majority of updates when shared by a large number of threads (e.g., 32 or more). Ironically, this problem becomes worse as contention increases, which is often the scenario the counters are intended to detect.

One approach to making counters scalable is to split them into per-thread components, with each thread incrementing its own component without synchronization. However, this approach may have several disadvantages. For example, if the counter is used by a dynamic set of threads, threads may need to be registered and deregistered, and there may need to be a way to iterate over the threads' components in order to read the counter. In addition, this approach may increase space requirements by a factor of the number of threads that use the counter. In various embodiments, the techniques described herein may mitigate these disadvantages to varying degrees.

In situations in which additional space overhead is undesirable or unacceptable, and counters must be precise, a randomized back-off (RBO) technique may be used to at least avoid a complete catastrophe under heavy contention. In some embodiments, NUMA lock algorithms or cohort locks (which may significantly improve performance and scalability under contention by handing off a lock multiple times within a given NUMA node before it is acquired on another node) may improve contention management for counters that employ RBO. For example, when a thread fails an attempt to increment the counter using a CAS type instruction (e.g., when contention arises), it may retry its attempt to increment the counter only after acquiring a cohort lock, thereby encouraging multiple updates on one NUMA node before an update on another node. This technique has been shown to be effective in improving performance over RBO. However, because of the space overhead of the cohort lock, this technique may provide little or no advantage over other approaches described herein.

In some embodiments, an approach that is similar to the above-mentioned NUMA locks, but that does not add significant space overhead, may use a few bits of the counter's value to identify which node of the nodes in a NUMA style memory architecture currently has priority. In such embodiments, as the counter is incremented, the values of these bits may (as part of normal operation) change from time to time, giving another node priority to update the counter. In other words, after some number of increment operations (depending on the position of the bits that indicate the priority node), the change in the value of these bits as a result of those increment operations may cause another node to become the priority node. In such embodiments, threads on other nodes may delay their updates, making it more likely that threads on the priority node can perform consecutive updates. Note that, in general, the bits used to identify the priority node may not include the lowest-order bits (i.e., those that change most frequently), but may be chosen so that the priority changes often enough to avoid unreasonable delays. This approach is simple, adds no space overhead, and has been shown to perform well when increment operations are spread relatively evenly across all nodes. However, it may not be as well suited to less uniform workloads.

One embodiment of a method for implementing a NUMA-aware shared counter (e.g., a NUMA-aware RBO type counter or another type of NUMA-aware counter) is illustrated by the flow diagram in FIG. 1. As illustrated at 110, in this example, the method may include a thread that is executing on a given node of a system that implements a NUMA style memory architecture initiating an increment of a shared counter. The method may also include the thread determining whether the threads executing on another node in the system currently have priority to update the counter or have requested priority to update the counter (as in 120). For example, in some embodiments, a few bits of the counter may be used to identify the node on which the thread that most recently updated the counter executed (thus, designating that node as a priority node), or a few bits of the counter may identify a node currently designated as a priority node based on other criteria. In some embodiments, another method may be used to designate whether a thread currently has priority to update the counter (or has requested such priority), and this method may include the use of an anti-starvation variable (as described in more detail herein).

As illustrated in this example, the method may include the thread attempting to increment the shared counter or delaying its attempt to increment the counter, dependent, at least in part, on the determination (i.e., dependent on whether the threads executing on another node in the system currently have priority to update the counter or have requested priority to update the counter), as in 130. For example, in some embodiments, if the thread determines (e.g., based on the values of a few designated bits in the counter or another priority node indicator) that threads executing on another node have (or have requested) priority to update the counter, the thread may delay its attempt to increment the counter, and may subsequently retry its attempt to increment the counter one or more times, e.g., until the attempt is successful or until a predetermined retry limit has been reached (e.g., according to various contention management policies). If the thread determines (e.g., based on the values of a few designated bits in the counter or another priority node indicator) that no priority has been set (or requested), or that the node on which the thread is executing currently has (or has requested) priority to update the counter, the thread may proceed with one or more attempts to increment the counter (e.g., until one of the attempts is successful or until a predetermined retry limit has been reached). Note that in some embodiments, a pre-determined default or initial value of counter bits that have been designated as identifying a priority node (or of a dedicated priority node indicator) may indicate that no priority has been requested or set yet.

In many of the examples described herein, it may be assumed that the computer system is organized into clusters of processor cores, each of which has one or more caches that are shared among the cores local to that cluster. In such embodiments, inter-cluster communication may be significantly more expensive than intra-cluster communication. In at least some of the examples described herein, the terms "cluster" and "node" may be used to refer to a collection of processor cores, and this collection of cores may include cores on a single multicore chip, or cores on a collection of multicore chips that have proximity to the same memory or caching structure, depending on the size of the NUMA machine implemented in the system. In these examples, it may also be assumed that each cluster has a unique cluster id known to all threads on the cluster.

Figure 2:
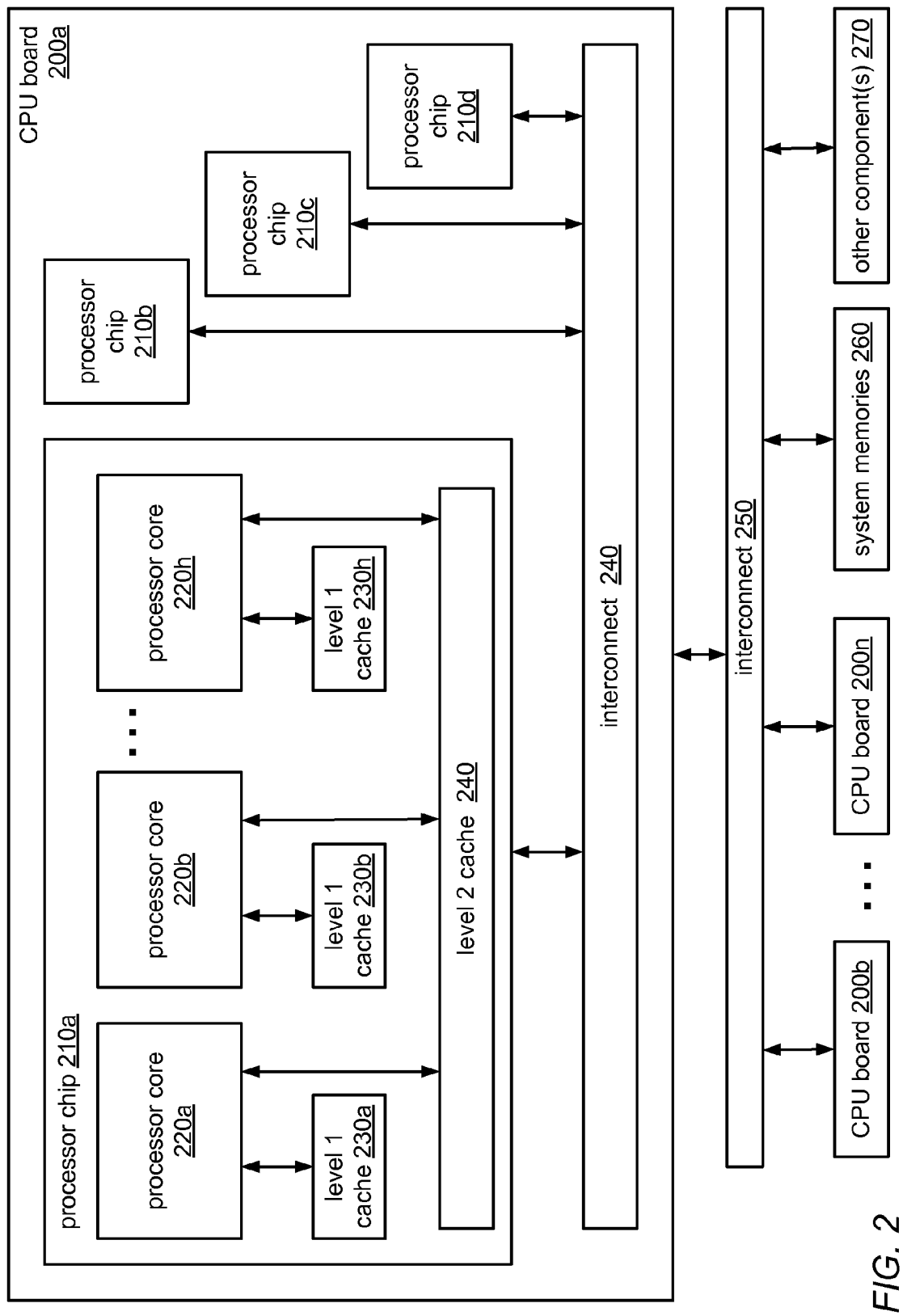
FIG. 2 is a block diagram illustrating a portion of a computer system that implements a NUMA style memory architecture.

FIG. 2 illustrates a portion of a computer system that implements a NUMA style memory architecture. In this example, the computer system includes multiple CPU boards 200 (shown as 200a-200n) that communicate with each other over interconnect 250. One of these CPU boards (200a) is illustrated in more detail than the others. In some embodiments, each of the CPU boards 200 may include the same or a similar architecture as that illustrated for CPU board 200a. In other embodiments, each of the CPU boards may include a different number and/or arrangement of processor chips, processor cores, caches, etc. For example, in some embodiments, there may one or more memory chips closely coupled to each processor chip that serve as "local memory" for its processor cores (not shown). As illustrated in FIG. 2, the computer system may also include one or more system memories 260 and/or other components 270. In this example, CPU board 200a includes four processor chips (shown as processor chips 210a-210d) that communicate with each other over interconnect 240, one of which is illustrated in more detail. In this example, it is assumed that the processor chips 210b-210d include a memory architecture similar to that of processor chip 210a.

In the example illustrated in FIG. 2, processor chip 210a includes eight processor cores (shown as 220a-220h), and each processor core has a respective (dedicated) level 1 (L1) cache (shown as 230a-230h). Each processor core may be a multi-threaded core, in some embodiments. For example, in one embodiment each processor core may be capable of concurrently executing eight hardware threads. The threads executing on a given processor core 220 may share the level 1 cache 230 for that processor core 220, and accesses to this level 1 cache, which may be considered local to the processor core 220 and its hardware threads, may be extremely fast. In addition, the eight processor cores 220 may share the level 2 (L2) cache 240 for processor chip 210a, and accesses to this level 2 cache may also be fast, although not as fast as those to each processor core's own level 1 cache. In this example, accesses to caches of a different processor chip 210 on the same CPU board 200, to caches of a processor chip 210 on a different CPU board 200, and to various system memories 260 (all of which may be considered remote accesses with respect to a hardware thread executing a particular processor core 220 of processor chip 210a) may exhibit increasingly higher latency, when compared to accesses to the level 1 and level 2 caches and/or other memories that are local to that hardware thread.

As previously noted, in some embodiments, performance gains may be obtained on NUMA architectures by employing shared counters that encourage threads with high mutual memory locality (e.g., threads executing on processor cores on the same processor chip, or on processor cores that are otherwise near each other) to increment the counters consecutively, thus reducing the overall level of cache misses when multiple threads initiate attempts to increment those counters. The systems and methods described herein for implementing NUMA-aware shared counters (e.g., counter data structures that may be resident in one or more system memories 260, and portions of which may be brought into various caches when they are updated and/or read by threads executing on corresponding processor cores in the system) may result in such high memory locality, since these techniques encourage batches of requests to increment such a counter from threads in a single cluster (e.g., threads that share a level 1 or level 2 cache) to be executed sequentially.

One embodiment of a NUMA-aware RBO counter, as described above, may be further illustrated by the example pseudo code below.

```
1   // Counter type : 3 bits saved for storing the node id
2   // (starting at 1), 29 bits for the actual counter.
3   //
4   struct Counter {
5       unsigned int val : 29;
6       unsigned int nid : 3;
7   };
8   // Global variable used to avoid starvation.
9   // If non-zero, it holds the id of the node that is
10  // asking threads on all other nodes to yield.
11  //
12  unsigned int g_deferReq = 0;
14  void Defer( ) {
15      for ( int i=0; i<YieldAmount; i++) Pause( );
16  }
18  void Inc(Counter* cP) {
19      unsigned int myNid = getNodeId( );
20      if (g_deferReq && g_deferReq != myNid) Defer( );
22      bool deferAsked = false ;
23      int patience = InitPatience ;
24      int backoffTime = InitBackoff ;
25      int penalty = InitPenalty ;
26      Counter seen = *cP;
27      while (true) {
28          Counter old = seen;
29          Counter newC = {old.val+1,myNid};
30          if (( seen = CAS(cP, old, newC)) == old) break;
31          if (seen. nid != myNid) {
32              if ( patience-- > 0 ) {
33                  // longer back-off, as long as g_deferReq is not set
34                  for ( int i=0; i<backoffTime + penalty; i++) {
35                      if (g_deferReq) break;
36                      Pause ( );
37                  }
38                  if (g_deferReq && (g_deferReq != myNid)) Defer ( );
39                  backoffTime *= 2; penalty *= 2;
40              } else {
41                  // requesting node ran out of patience; tries asking for Yield
42                  if (! deferAsked)
43                      deferAsked = (CAS(&g_deferReq, 0, myNid) == 0);
44                  if (! deferAsked && g_deferReq != myNid) {
45                      // Another node beat the requestor to setting deferReq
46                      Defer ( );
47                      patience = InitPatience ;
48                  }
49                  backoffTime = InitBackoff ;
50              }
51          } else {
52              if ( patience < InitPatience ) {
53                  // now post transition to priority for requesting node, init backoff
54                  patience = InitPatience ; backoffTime = InitBackoff ;
55              }
56              for ( int i=0; i<backoffTime; i++) Pause ( );
```

```
57      backoffTime *= 2;
58    }
59    seen = *cP;
60  }
61  if (deferAsked) g_deferReq = 0;
62 }
```

As illustrated in the example pseudo code above, in some embodiments, a counter may be augmented with a few bits (or alternatively may steal a few bits from the counter, thereby restricting its range) that are used to store an indication of a node whose threads currently have priority to update the counter. This approach may require only enough additional bits to store an identifier of a NUMA node (e.g., a node ID) plus one more bit. In the illustrated example, the technique can accommodate a counter that holds values in a range from 0 to $2^{(N-1)-\lceil log_2(\#NODES)\rceil}-1$ using N bits. For example, in one embodiment, the counter may include 32 bits, three of which may be stolen to store a NUMA node ID, thus restricting the counter's range to $2^{29}-1$. In this example, these three bits may be used to store the ID of the node on which the counter was last incremented together with the counter, thereby allowing and/or requesting that threads on other nodes hold off their attempts to increment the counter in order to encourage consecutive increments on the identified node. In other embodiments, a different number of bits of the counter data structure may be used to store an identifier of the node whose threads currently have priority to update the counter.

Figure 3A:
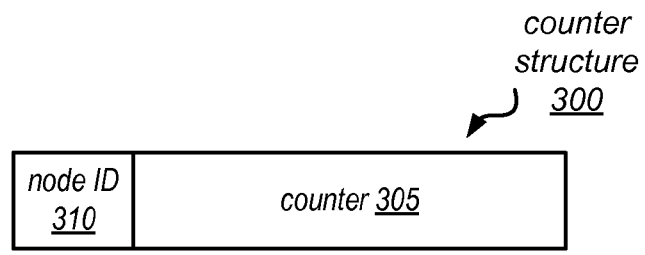
FIGS. 3A-3F are block diagrams illustrating examples of various counter structures described herein.
Figure 3B:
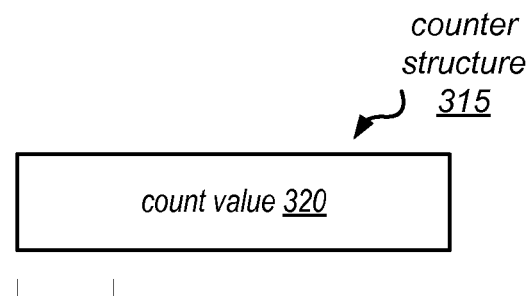
Figure 3C:
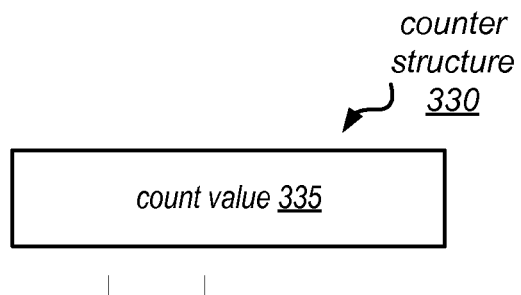

FIGS. 3A-3F are block diagrams illustrating various embodiments of some of the different counter data structures that are described herein. For example, FIG. 3A illustrates a counter structure 300 in which a counter 305 has been augmented with additional bits 310 that store a node ID. FIG. 3B illustrates a counter structure 315 in which a highest-order subset of the bits of the stored count value 320 (shown as 325) have been "stolen" from the count value field and used to indicate a node ID. In some embodiments, this subset of the bits may be reserved to store a node ID, and various node ID values may be explicitly written into this portion of counter structure 315 (e.g., when count value 320 is being updated). In other embodiments, the values of these bits may simply reflect the corresponding bit values of the count value 320 that is stored in counter structure 315. FIG. 3C illustrates a counter structure 330 in which a subset of the bits that does not include the highest-order bits of the count value 335 (shown as 340) represents a node ID. In this example, the values of these bits may simply reflect the corresponding bit values of the count value 335 that is stored in counter structure 330. In general, any subset of the bits of a stored count value may be designated as indicating a node ID, in different embodiments, and the selection of the subset of bits may affect the number of consecutive increment operations by threads executing on a single node.

Figure 3D:
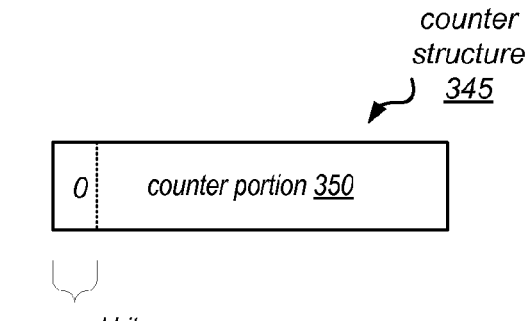
Figure 3E:
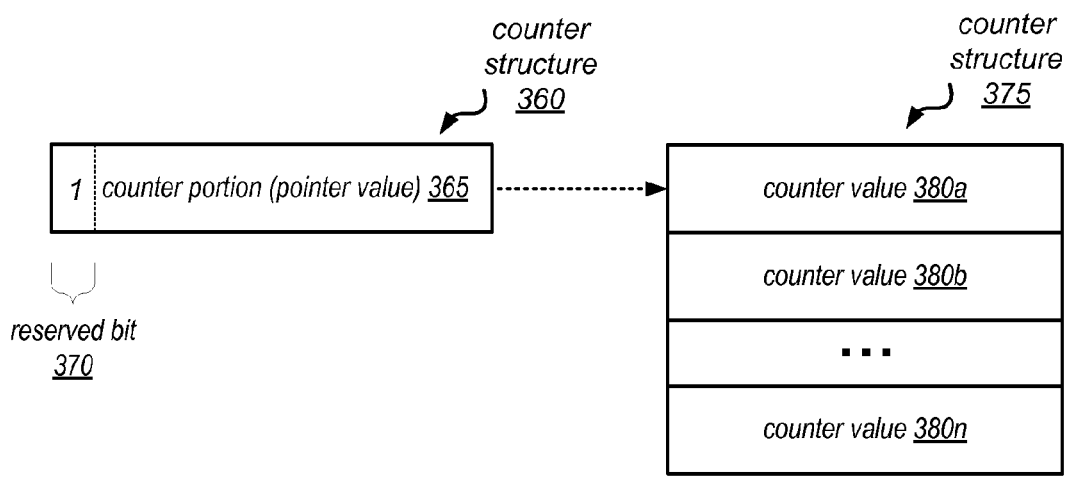
Figure 3F:
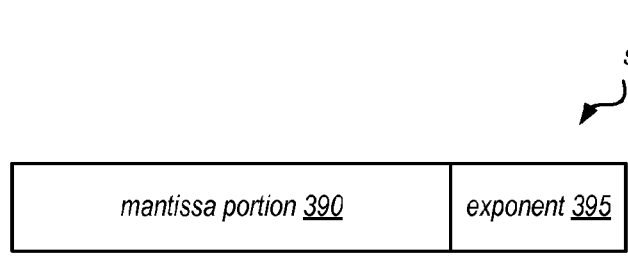

As described in more detail below, FIGS. 3D-3E illustrate a counter structure that in some embodiments may become inflated in response to certain conditions. For example, FIG. 3D illustrates a counter structure 345 in which a reserved bit 355 indicates whether the counter portion 350 stores a count value or a pointer to another structure. In this example, since the value of the reserved bit 355 is zero, the counter portion 350 stores a count value. Similarly, FIG. 3E illustrates a counter structure 360 in which a reserved bit 370 of the counter value 350 indicates whether the counter portion 365 stores a count value or a pointer to another structure. In this example, since the value of the reserved bit 370 is one, the counter portion 365 stores a pointer value and this pointer value points to an additional counter structure 375. In this example, counter structure 375 stores multiple count values, shown as 380a-380n. FIG. 3F illustrates a data structure that may be used to implement a probabilistic counter, in some embodiments. In this example, FIG. 3F illustrates a counter structure 385 that includes a mantissa portion 390 and an exponent portion 395.

Note that in some embodiments of the NUMA-aware counters described above, including counters represented by the example pseudo code above, a thread that waits too long to attempt to update the counter may become impatient, at which point it may store its node ID into an anti-starvation variable. In such embodiments, each shared counter may be associated with such an anti-starvation variable, but it may not be necessary to have a separate anti-starvation variable per counter. For example, in some embodiments, a single anti-starvation variable may be employed to ask threads on other nodes to wait before attempting to update one or more shared counters associated with that anti-starvation variable, thus enabling threads on the node with the impatient thread to bring the cache line containing the counter to that node and increment the counter. Note, however, this approach may not prevent other threads (e.g., other threads on the same node) from incrementing the counter before the impatient thread (thus preserving the non-blocking property of the counter). The heuristic approach described above has been shown to avoid starvation in practice, even under heavy contention. Note that in some embodiments, including in the example illustrated in the pseudo code above, a single, global anti-starvation variable may be employed to ask threads on other nodes to wait before attempting to update any or all of the shared counters that are accessible to a multithreaded application.

In some embodiments that employ this NUMA-aware approach to incrementing a shared counter, threads on the same node as a thread that has become impatient may abort their delay (e.g., a slow back-off) in response to the impatient thread setting the anti-starvation variable, and may attempt to increment the counter immediately. In such embodiments, regardless of which thread on a node increments the counter, this may have the effect of bringing the relevant cache line onto that node, which may give all threads on that node a better chance to increment the counter. In such embodiments, rather than attempting to ensure that the thread that becomes impatient is the next to increment the counter, nearby threads whose increments will help the impatient thread may be allowed to increment the counter before the impatient thread. This approach has been found to result in better performance than a more restrictive approach.

Figure 4:
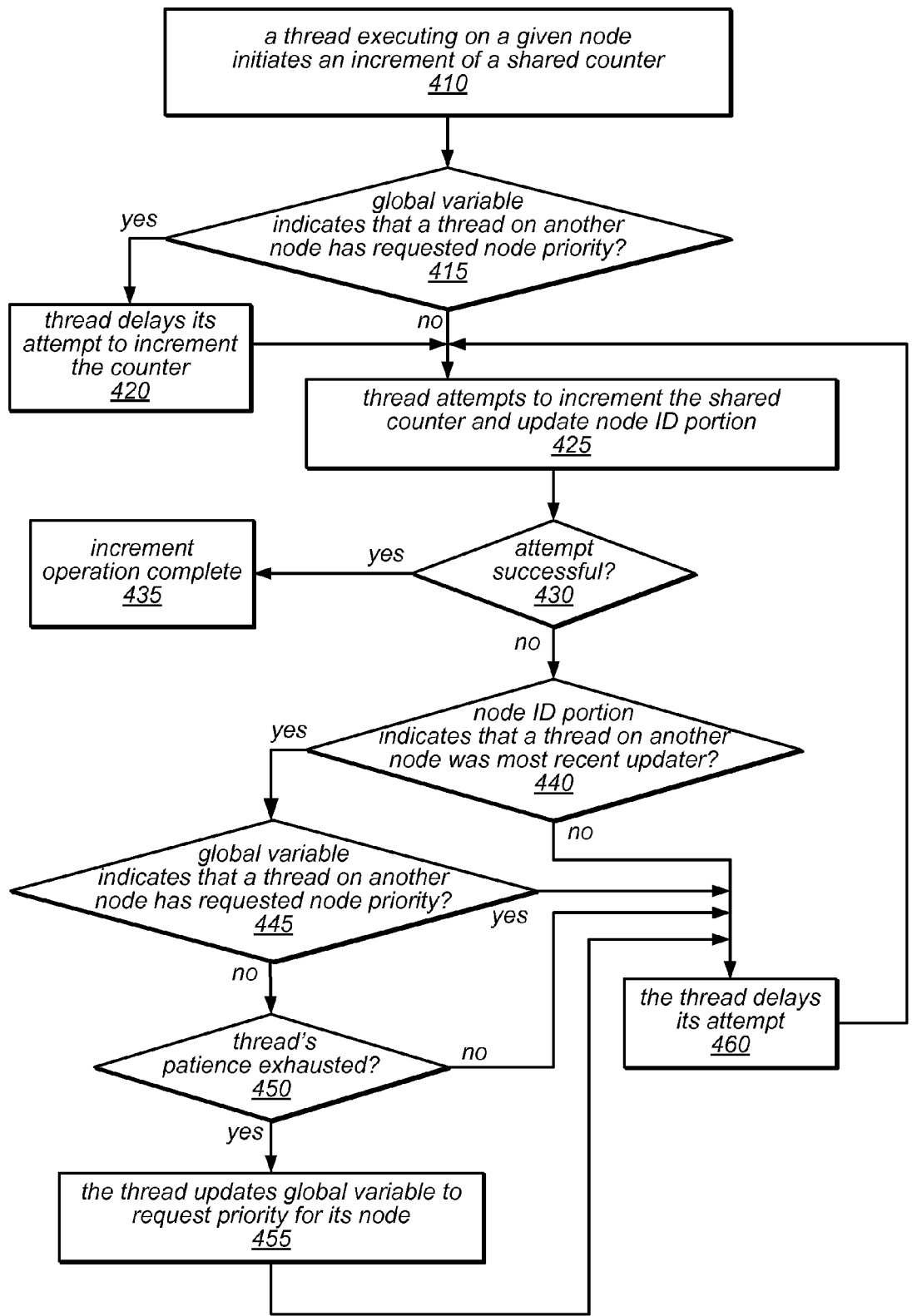
FIG. 4 is a flow diagram illustrating a method for incrementing a NUMA-aware shared counter, according to one embodiment.

One embodiment of a method for incrementing a NUMA-aware shared counter is illustrated by the flow diagram in FIG. 4. As illustrated at 410, in this example, the method may include a thread that is executing on a given node of a system that implements a NUMA style memory architecture initiating an increment of a shared counter. The method may include determining (e.g., as part of an attempt to increment the counter) whether a global variable indicates that a thread on another node has requested priority for updating the counter on behalf of the threads executing on the other node, as in 415. For example, in various embodiments, if an anti-starvation variable is set, holds a particular pre-determined value, or holds an identifier of another node, the anti-starvation variable may indicate that a thread on another node has requested priority for updating the counter. If the global variable indicates that a thread on another node has requested priority for the threads on the other node (shown as the positive exit from

415), the method may include the thread delaying its attempt to increment the counter, as in 420. For example, in different embodiments, the thread may delay its attempt by a predetermined or random amount, after which the thread may attempt to increment the shared counter and (e.g., atomically, along with incrementing the count value stored in the counter structure) to update a node ID portion of the counter structure to reflect the node on which the thread is executing (as in 425). Note that in some embodiments, one or more parameters controlling the amount of time by which an attempt is delayed may have different values when the node ID field indicates that the last update was performed by a thread on the same node than when the node ID field indicates that the last update was performed by a thread on a different node.

In this example, if the global variable indicates that no thread on another node has requested priority to update the counter (shown as the negative exit from 415), the method may include the thread attempting to increment the shared counter and (e.g., atomically, along with incrementing the count value stored in the counter structure) to update a node ID portion of the counter structure to reflect the node on which the thread is executing (as in 425). In some embodiments, attempts to increment the count value and update of the node ID portion of the counter structure may be performed using a single CAS type operation or a similar synchronization operation. As illustrated in this example, if the attempt to increment the counter and node ID is successful (shown as the positive exit from 430), the increment operation may be complete, as in 435. On the other hand, if the attempt to increment the counter and node ID is not successful (shown as the negative exit from 430), and if the node ID portion of the counter structure does not indicate that a thread on another node was the most recent thread to update the counter (shown as the negative exit from 440), the method may include the thread delaying its attempt to increment the counter, as in 460. For example, in different embodiments, the thread may delay its attempt by a predetermined or random amount, after which the thread may retry its attempt to increment the shared counter and to update a node ID portion of the counter structure to reflect the node on which the thread is executing (shown as the feedback from 460 to 425).

As illustrated in this example, if the attempt to increment the counter and node ID is not successful (shown as the negative exit from 430), and if the node ID portion of the counter structure indicates that a thread on another node was the most recent thread to update the counter (shown as the positive exit from 440), the method may include determining whether a global variable indicates that a thread on another node has requested node priority (as in 445). If so (shown as the positive exit from 445), the method may include the thread delaying its attempt to increment the counter, as in 460. For example, in different embodiments, the thread may delay its attempt by a predetermined or random amount, after which after which the thread may retry its attempt to increment the shared counter and to update a node ID portion of the counter structure to reflect the node on which the thread is executing (shown as the feedback from 460 to 425). If the global variable does not indicate that a thread on another node has requested node priority (shown as the negative exit from 445), but the thread's patience has been exhausted (shown as the negative exit from 450), the method may include the thread delaying its attempt to increment the counter, as in 460. For example, in different embodiments, the thread may delay its attempt by a predetermined or random amount, after which the thread may retry its attempt to increment the shared counter and to update a node ID portion of the counter structure to reflect the node on which the thread is executing (shown as the feedback from 460 to 425). Otherwise, (shown as the negative exit from 445 and the negative exit from 450), the method may include the thread updating the global variable to request priority for its node (as in 455) and then delaying its attempt to increment the counter, as in 460.

Although the NUMA-aware approach to incrementing a shared counter described above may in some embodiments yield an order of magnitude better throughput than a standard RBO approach under heavy contention, it may impose significant overhead in low-contention scenarios. For example, the approach described so far includes testing the anti-starvation flag before each attempt to increment the counter. In other embodiments, an adaptive NUMA-aware approach may be employed in which the incrementing operation is dependent on a current, recent, or historical amount of contention experienced by the counter. For example, in some embodiments, an adaptive NUMA-aware approach may initially respond to requests to increment the counter by incrementing a regular counter that does not record the node ID of the thread that most recently incremented the counter. For example, the counter data structure may be initialized (e.g., during an initialization phase of a multithreaded application) to an initial or default value indicating that any thread may attempt to increment the counter without having to also write to the node ID portion of the counter. In such embodiments, while there is no node ID recorded, there may be no need to check the anti-starvation variable.

In this adaptive NUMA-aware approach, a thread that retries its attempt to increment the counter more than a predetermined number of times (e.g., more than three times in rapid succession, followed by 16 times with a randomized back-off period) before successfully incrementing the counter, may (once it finally succeeds) record its node ID in the counter. Thereafter, the slower but more scalable NUMA-aware techniques described above may be applied in response to subsequent requests to increment the counter. In some embodiments, the counter may be reset (or returned) to an ordinary counter occasionally (e.g., periodically or according to various policies, including a decrease in contention for the shared counter), so that the effects of occasional contention do not persist forever. For example, the node ID portion of the counter may occasionally be reset to an initial or default value indicating that no threads on any of the nodes have (or have requested) priority to increment the counter, and threads attempting to increment the counter when this initial or default value is stored in the node ID portion of the counter may attempt to increment the counter without having to also write a value to the node ID portion of the counter. This adaptive NUMA-aware approach has been shown to be competitive with the best of the existing RBO approaches and with the non-adaptive NUMA-aware approach described above at all contention levels.

Figure 5:
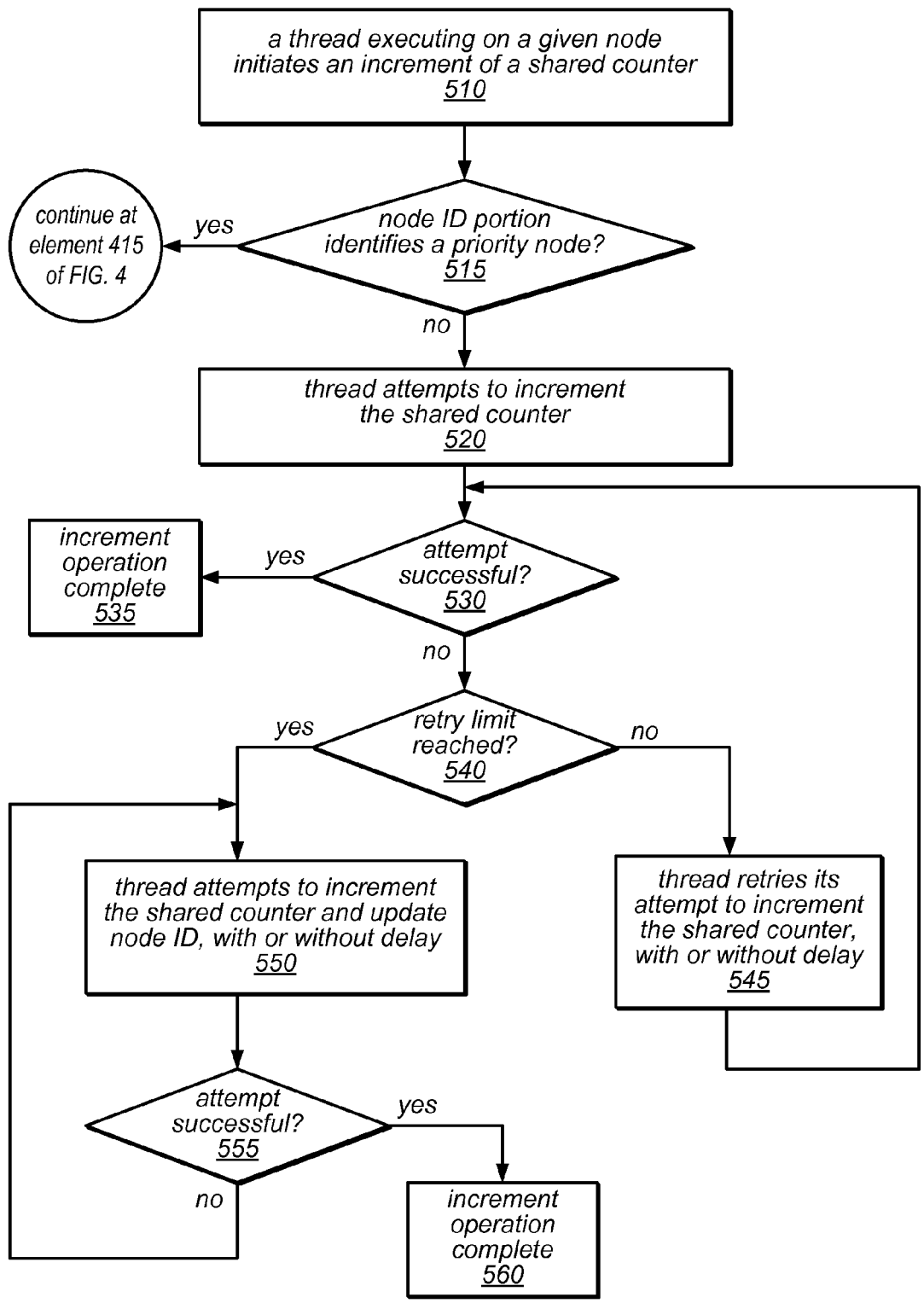
FIG. 5 is a flow diagram illustrating a method for incrementing a NUMA-aware shared counter that is dependent on contention for the shared counter, according to one embodiment.

One embodiment of a method for incrementing a NUMA-aware shared counter that is dependent on contention for the shared counter is illustrated by the flow diagram in FIG. 5. As illustrated at 510, in this example, the method may include a thread executing on a given node initiating an increment of a shared counter. If a node ID portion of the shared counter identifies a node that has (or has requested) priority (shown as the positive exit from 515), the method may include continuing its attempt to increment the shared counter as in the method illustrated in FIG. 4, beginning with element 415. If the node ID portion of the shared counter does not identify a node that has (or has requested) priority (shown as the negative exit from 515), the method may include the thread attempting to increment the shared counter, as in 520. In some embodiments, attempts to increment the shared counter may be performed using a CAS type operation or a similar synchronization operation.

As illustrated in this example, if the attempt to increment the shared counter is successful (shown as the positive exit from 530), the increment operation may be complete (as in 535). On the other hand, if the attempt to increment the shared counter is not successful (shown as the negative exit from 530) but a retry limit has not yet been reached (shown as the negative exit from 540), the method may include the thread retrying its attempt to increment the shared counter one or more times, with or without delay, as in 545. For example, the thread may repeat its attempt to increment the shared counter using a single CAS type operation or a similar synchronization operation with or without an intervening back-off period. This is illustrated in FIG. 5 by the feedback from 545 to 530. If an attempt to increment the shared counter is not successful (shown as the negative exit from 530) and the retry limit has been reached (shown as the positive exit from 540), the method may include the thread attempting to increment the shared counter and to update a node ID portion of the counter structure to reflect the node on which the thread is executing, with or without delay, as in 550. As illustrated in this example, if this attempt is not successful (shown as the positive exit from 555), the method may include repeating the attempt to increment the shared counter and to update the node ID portion of the counter structure one or more times until it is successful (or until aborted due to various applicable retry or contention management policies). This is illustrated in FIG. 5 by the feedback from 555 to 550. Once the attempt to increment the shared counter and to update the node ID portion of the counter structure is successful (shown as the positive exit from 555), the increment operation may be complete, as in 560.

In various embodiments, the counters described so far may achieve good single-threaded performance and scalability under heavy contention. However, their advantage over a simple RBO type counter may be reduced under moderate load, because there may be less opportunity to perform consecutive increments on the same node. In addition, these counters may be sensitive to system-specific tuning, which may make them less stable than some other approaches. In other embodiments, counters that use a little more space, some of which are described below, may reduce or eliminate these effects.

In some embodiments, an approach referred to as a "multiline" approach may be used to avoid expensive cross-node communication without introducing the disadvantages of per-thread counter components described above. For example, in some embodiments, a multiline approach may employ a separate counter component per NUMA node. In such embodiments, synchronization on per-node components may be implemented using CAS type instructions to increment each of the counter components, with or without a randomized back-off period between attempts to increment the counter. Note that when using a CAS type instruction for synchronization in this case, there is no cross-node contention to worry about. When employing a multiline approach, reading the counter may involve reading each component in turn, with no synchronization, and returning the sum of the values read. Note that the correctness of this approach may depend on the assumption that increment operations only add one to the count. However, in embodiments in which this assumption does not apply, other techniques may be employed to the same effect.

Although the increase in space when employing a multiline approach is limited by the number of nodes, it may be preferable to avoid an increase in space entirely for counters that are incremented only rarely. In some embodiments, an adaptive approach, referred to herein as a "multiline-adapt" approach may be employed in which the incrementing operation is dependent on the current, recent, or historical amount of contention for the counter. For example, in some embodiments, a multiline-adapt approach may initially employ and increment a standard counter, and may "inflate" it to use the above-described multiline technique only if more than a pre-determined number of attempts (e.g., four in one embodiment) to increment the standard counter fail. Other policies may be applied in other embodiments, e.g., inflating the counter if it frequently causes remote cache misses. In some embodiments, inflating the counter may include allocating an additional structure that includes one counter per node and replacing the standard counter with a pointer to that structure. In some such embodiments, one bit of the initial (regular) counter structure may be reserved to distinguish whether the initial structure stores a pointer to the additional structure or counter values. One example of such a counter is illustrated in FIGS. 3D-3E and described above.

In some embodiments, the space overhead for low-contention counters that employ a multiline-adapt approach may be just the reserved bit (which in practice would reduce the range of the counter by half), and the higher space overhead may only apply to counters experiencing higher contention (according to various pre-determined contention management policies). In some embodiments, a multiline-adapt approach introduces an extra level of indirection for contended counters, which may slow down the increment operation for the counter. However, in practice this may not result in a significant performance issue when the counter is contended, since it may reduce the rate of CAS type increment attempts on the initial counter structure (hence reducing the overall contention experienced by a multithreaded application).

Figure 6:
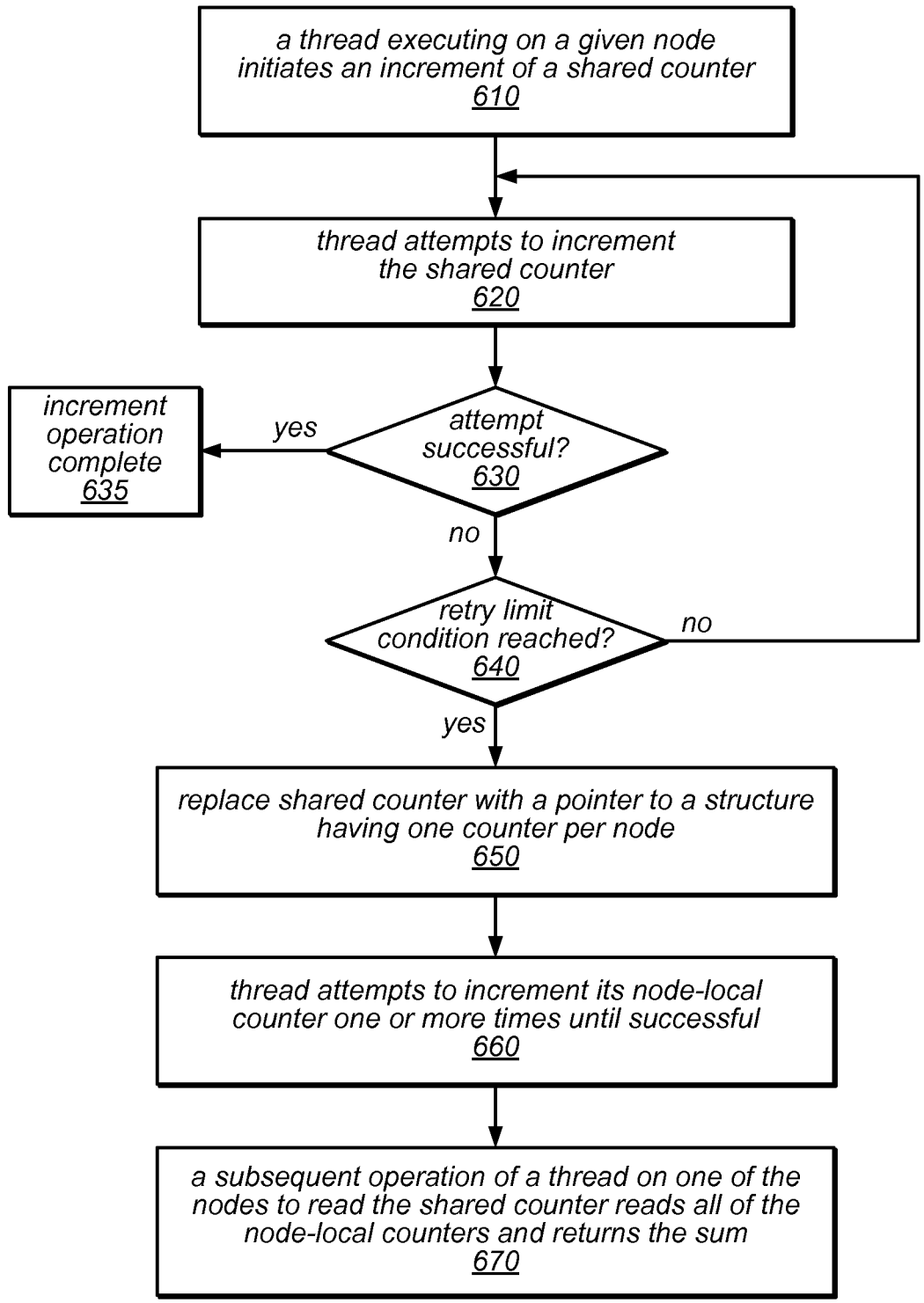
FIG. 6 is a flow diagram illustrating a method for inflating a shared counter in response to contention, according to one embodiment.

One embodiment of a method for inflating a shared counter in response to contention is illustrated by the flow diagram in FIG. 6. As illustrated at 610, in this example, the method may include a thread executing on a given node initiating an increment of a shared counter. In some embodiments, the thread may attempt to increment the shared counter (as in 620), e.g., using a CAS type operation with or without an intervening back-off period. If the attempt to increment the shared counter is successful (shown as the positive exit from 630), the increment operation may be complete (as in 635). If the attempt to increment the shared counter is not successful (shown as the negative exit from 630), but an applicable retry limit condition has not been met (shown as the negative exit from 640), the method may include the thread repeating its attempt to increment the counter one or more times until it is successful or until the retry limit condition has been met. This is illustrated in FIG. 6 by the feedback from 640 to 620. In various embodiments, the retry limit condition may be based on the number of unsuccessful attempts, the number of cache misses or on another applicable retry or contention management policy.

As illustrated in this example, if the attempt to increment the shared counter is not successful (shown as the negative exit from 630), and the applicable retry limit condition has been met (shown as the positive exit from 640), the method may include replacing the shared counter (or a count portion thereof) with a pointer to a structure that includes one counter per node (i.e., one or more node-local counters), as in 650. For example, in some embodiments, one bit of the counter may be used to indicate whether the value of the counter portion currently represents a count value or represents a pointer to a multiple counter structure. The method may also include the thread attempting to increment its node-local counter one or more times until it is successful, as in 660. For example, the thread may attempt to increment its node-local counter using a CAS type operation or a similar synchronization operation with or without an intervening back-off period. As illustrated in this example, in some embodiments, a subsequent operation of a thread on one of the nodes to read the value of the shared counter may do so by reading all of the node-local counters and returning the sum of their counter values.

In some embodiments, the multiline-adapt approach described herein may provide a counter that is competitive in both space overhead and throughput with the basic RBO counter described above at low levels of contention, that scales well with increasing contention, and that yields a much higher throughput than a basic RBO counter under high contention (e.g., more than 700× throughput, in some experiments). Note that in some embodiments, counters employing multiline and multiline-adapt approaches may suffer under high contention levels because of contention between threads on the same node using a single component. In some such embodiments, this type of contention may be alleviated by using more components per node. For example, while per-node components must be in separate cache lines to avoid false sharing between nodes, if more than one component is employed per node, it may not be unreasonable to locate multiple components for a single node in the same cache line. While false sharing may still impose some overhead in this case, it may be only within one NUMA node. In addition, there may still be benefit from using multiple components, as fewer CAS failures should occur in this case. Thus, it may be possible to improve performance without increasing space usage using this approach, in some embodiments.

Note that in some embodiments, the additional space overhead incurred by a multiline approach may be unacceptable in systems with large numbers of statistics counters, most of which are not heavily contended. While the multiline-adapt approach described above may incur this space overhead only for contended counters, if different counters are contended at different times, this may result in excessive overhead over time. Furthermore, in some embodiments, these approaches increase latency for operations that read the counter and/or they may be unacceptable due to their use of dynamically allocated memory, in some contexts. As described in more detail below, in some embodiments, some or all of these issues may be avoided if and when counters are not required to be precise.

As previously noted, simple unsynchronized counters typically lose significant fractions of counter updates, even at moderate levels of contention. Because counters are often used to detect excessive rates of various system events, these naïve implementations are (ironically) least effective exactly when the data they should provide is most important. Nonetheless, in some contexts and for some applications, precise counts may not be required. As described in more detail below, in some embodiments, counters may exploit this flexibility while still aiming to maintain a prescribed level of accuracy that is not achieved by naïve counter implementations.

One existing probabilistic counter (sometimes referred to as a "Morris counter") can represent a larger range of values than the number of bits it contains (e.g., eight bits) usually does. The Morris counter does this by storing a probabilistic approximation of a count value, which is referred to herein as v(n), where n is the precise count (i.e., how many times a corresponding increment operation has been invoked), according to the following:

$$v(n)=\log(1+n/a)/\log(1+1/a).$$

In this example, a represents a parameter whose value controls the accuracy of the counter, as explained below. In this example, adding one to n/a (as in the denominator) ensures that the function is well defined and equals zero when n=0. In addition, dividing by log(1+1/a) ensures that the function is one when n=1. In other words, this approximation ensures that the counter contains accurate values at least for values zero and one. It follows from this definition that, when the value stored in the counter is v, the precise count it represents is:

$$n(v)=a((1+1/a)^v-1).$$

In various descriptions herein, the value v that is physically stored in a probabilistic counter may be referred to as the "stored value", and the value n(v) that it represents may be referred to as the "projected value" or the "estimated value" of the number of events that occurred of the type "counted" by the probabilistic counter. In other words, the Morris counter stores a probabilistic approximation v(n), where n is the precise count. In this example, the stored value must be an integer, as this example assumes the use of only eight bits. As a result, the precise count cannot be determined from the stored value. Therefore, there is no deterministic way to know when to increment the value stored in the counter to reflect that enough increments have occurred such that the counter's value should now be represented by a higher stored value. To address these issues, the Morris counter algorithm increments the stored value with probability, p(v), when the counter contains the value v, as follows:

$$p(v)=1/(n(v+1)-n(v))$$

Intuitively, this means that on average, the value stored in the Morris counter will be incremented once out of the n(v+1)−n(v) increment operations after a given value v is stored. This ensures that the value projected by the stored value is a random variable whose expected value is equal to the precise count. To avoid computing probabilities on each increment, an existing algorithm for implementing this probabilistic counter pre-computes all 256 probabilities for a given value of a, and stores them in a lookup table. In this example, the lookup table does not need to be replicated for each counter, but only for each accuracy class (i.e., each choice of a).

In this example, the parameter a may determine both the range that the Morris counter can represent and the expected error between the projected and actual counts, measured as the ratio between the standard deviation (STDV) of the projected value and the actual count (sometimes referred to as the relative STDV, or RSTDV). The variance of the projected value when the precise count is n is given by $\sigma^2=n(n-1)/2a$, from which it follows that the RSTDV is roughly $1/\sqrt{2a}$ as n grows large. In one example, choosing an accuracy parameter value of a=30 yields an RSTDV of about ⅛. In this example, this choice of a allows the counter to represent n(255), which is about 130,000. While this may be impressive for a counter structure that uses only eight bits, this may not satisfactory (in terms of range and/or accuracy) for many of the types of statistics counters used in modern computer systems. As described in more detail below, this approach may be modified in order to implement scalable counters with much larger ranges and higher accuracy, in some embodiments.

Note that because n(v) is exponential in v, updates on a Morris counter become less frequent as the precise count grows. In some embodiments, a probabilistic counter may exploit this property in order to reduce contention on frequently updated shared counters, while bounding expected error. In some embodiments, probabilistic counters may be implemented that provide a larger range and higher accuracy than is possible using the Morris counter approach described above. Note that simply extending the approach described above to Morris counters that use more bits may not be acceptable in some contexts, as it may become significantly less desirable to pre-compute update probabilities for all possible stored values as more counter bits are used. In some embodiments, the probabilistic counters and corresponding increment operations described below may extend the techniques described above in a manner that avoids this requirement. For example, it has been observed that the probability to increment the stored count from v to v+1 is a geometric series in v with a factor of a/(a+1), as shown below:

$$n(v+1) - n(v) = a((1+1/a)^{v+1} - (1+1/a)^v)$$
$$= a((1+1/a)^v (1+1/a - 1))$$
$$= (1+1/a)^v$$
$$\Rightarrow p(v) = 1/(1+1/a)^v = (a/(a+1))^v$$

Therefore, in some embodiments, for a given value p(v), the value of p(v+1) may be computed simply by multiplying the value p(v) by a/(a+1). In some embodiments, this constant may be pre-computed to avoid repeatedly performing this floating point division operation. It has also been observed (e.g., given the above) that n(v)=a(1/p(v)−1). Therefore, in some embodiments, the projected value n(v) of the stored counter value v of a probabilistic counter may be computed directly from p(v), without knowing v. In fact, in some embodiments doing so may be on the order of five times faster than computing n(v) directly from v. Therefore, in some embodiments, rather than storing v in the probabilistic counter, as in the Morris counter example above, a counter structure for a probabilistic counter may instead store the floating point value p(v). In one example, such a counter structure may store a 32-bit floating point representation of p(v), but in other embodiments, the range and/or accuracy may be extended further by storing values of p(v) using 64-bit double words. In some embodiments, using this approach, for each invoked increment operation that targets the counter, the value p stored in the counter may be read, and with probability p it may be replaced with a value equal to p*a/(a+1). This approach may provide a faster evaluation of the projected counter value, and may avoid the need to pre-compute and store values for all $2^b$ bits when using b bits to represent a counter, when compared to the Morris counter approach described above. Instead, only the value of a that yields the desired RSTDV and the corresponding value of a/(a+1) may need to be pre-computed.

In various embodiments of such a probabilistic counter, during each increment operation that targets the counter, the stored value may be updated with probability p, which may be equal to (or may be determined dependent on) the stored probability value itself (i.e., the most recently stored value). For example, in one embodiment, the increment operation may employ a thread-local XOR-shift pseudorandom number generator with parameters (6, 21, 7), which may return an integer i having a value between 1 and a maximum integer value, MaxInt (which, in this example, would be equal to $2^{32}-1$). In this example, the stored value may be updated if i/MaxInt≤p. In some embodiments, the probabilistic counter structure may store (MaxInt*p) (e.g., as a floating point number), so that the increment operation only needs to compare i to the stored value to determine whether to update the stored value. This stored value may be referred to herein as a "threshold". In this example, the initial threshold $T_o$=MaxInt, and when the stored value is updated, the current value $T_i$ is replaced with a value $T_{i+1}$=*a/(a+1)) if and only if the number returned by the pseudorandom number generator is at most $T_i$. Example pseudo code that may be used to implement this technique is presented below, according to one embodiment.

```
1    // Accuracy is given as number of percents for RSTDV
2    //
3    template <int Accuracy>
4    class ProbCounter {
5    private :
6       float threshold ;
8       // Static ( global per accuracy class ) info
9       //
10      static float s_a ;
11      static float s_ probFactor ;       // a/(a+1)
13   public:
15      static StaticInit ( ) {
16         // a = 1/(2*err^2)
17         //
18         float tmp = (( float )Accuracy/100.0);
19         s_a = 1/(2*tmp*tmp);
20         s_probFactor = s_a /( s_a +1.0);
21      }
23      ProbCounter( ) {
24         threshold = (double)MaxInt;
25      }
27      unsigned int GetVal( ) {
28         float pr = threshold /MaxInt;
29         float val = (1.0/ pr − 1.0)*s_a;
30         return lroundf ( val );
31      }
33      void Inc ( ) {
34         unsigned int r = rand ( );
35         float seenT = threshold ;
37         while(true) {
38            if ( r > (unsigned int)seenT) return;
40            bool overflow = (seenT < s_a + 1.0);
41            float newT = seenT * s_probFactor ;
42            if (overflow) newT = ( float )MaxInt;
44            float expected = seenT;
45            seenT = CAS(&threshold, seenT, newT));
46            if (seenT == expected) return;
47         }
48      }
49   }
```

Figure 7:
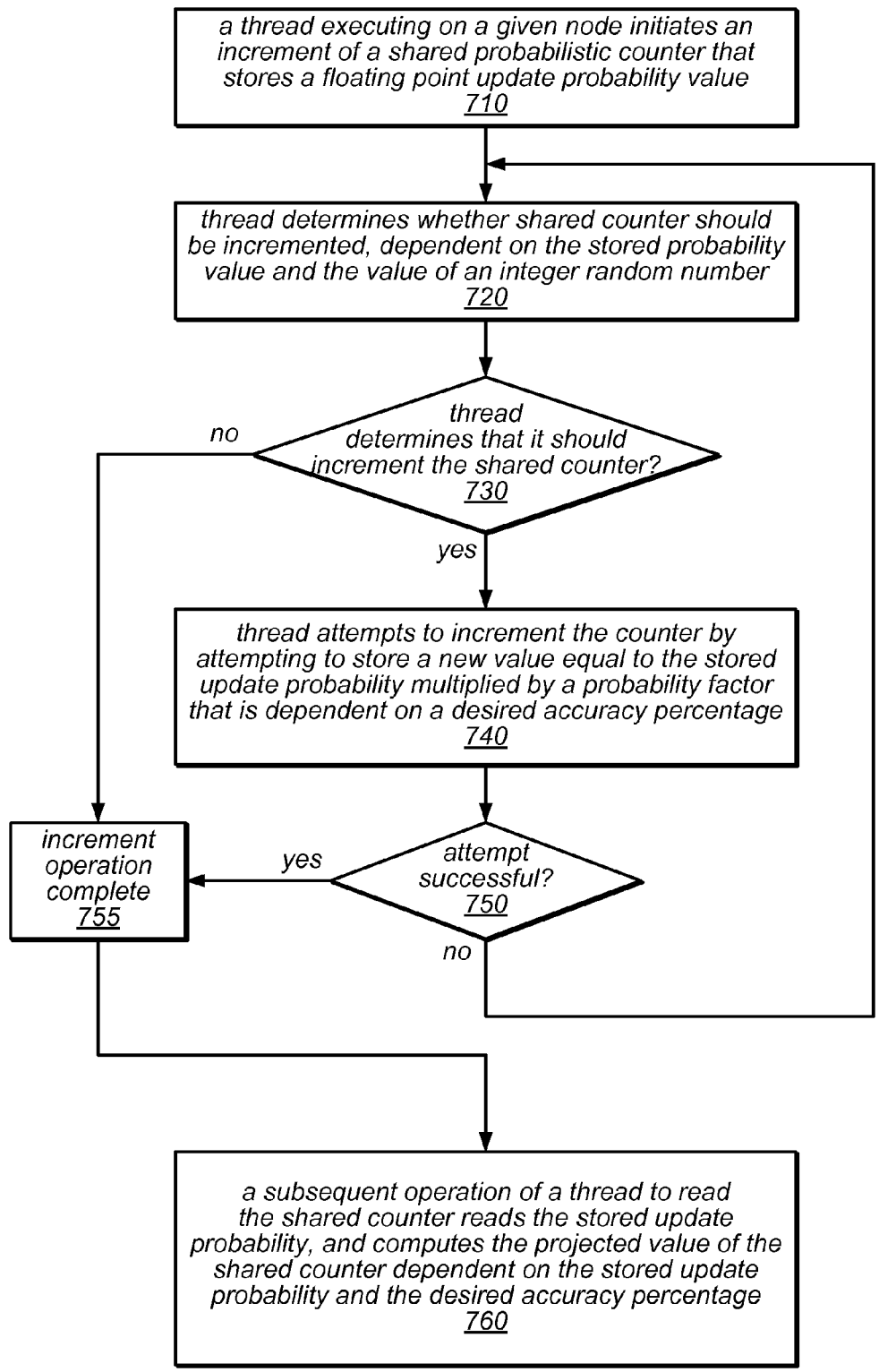
FIG. 7 is a flow diagram illustrating a method for incrementing a probabilistic counter that stores a floating point value, according to one embodiment.

One embodiment of a method for incrementing a probabilistic counter that stores a floating point value is illustrated by the flow diagram in FIG. 7. As illustrated at 710, in this example, the method may include a thread executing on a given node initiating an increment of a shared probabilistic counter that stores a floating point update probability value (such as those described herein). The method may also include the thread determining whether the shared counter should be incremented, dependent on the stored probability value and the value of an integer random number, as in 720. For example, in some embodiments, the determination may be dependent on the value of an integer random variable whose value is between 0 and a predetermined maximum value (e.g., maxint). Note that in some embodiments, the determination may involve the use of a floating point operation to compare the floating point representation of the update probability to this integer random number. If the thread determines that it should not increment the shared counter (shown as the negative exit from 730), the increment operation may be complete (i.e., without incrementing the shared counter), as in 755.

As illustrated in this example, if the thread determines that it should increment the shared counter (shown as the positive exit from 730), the method may include the thread attempting to increment the counter by attempting to store a new value in the shared counter that is equal to the stored update probability multiplied by a probability factor that is dependent on a desired accuracy percentage, as in 740. For example, in some embodiments, the thread may attempt to store the new value in the shared counter using a single CAS type operation (or a similar synchronization operation) with or without an intervening back-off period. If the attempt to increment the shared counter is not successful (shown as the negative exit from 750), the method may include the thread repeating its attempt to increment the shared counter one or more times until it is successful (or until the attempt is aborted due to various applicable retry or contention management policies—not shown). This is illustrated in FIG. 7 by the feedback from 750 to 720. Note that in this case, the method may include repeating the determination of whether (or not) to update the stored value (based on the update probability) because if the attempt to increment the shared counter failed due to a conflict, this may indicate that another operation (e.g., an increment operation of another thread) has modified the update probability since the previous determination was made. Once an attempt to increment the shared counter is successful (shown as the positive exit from 750), the increment operation may be complete, as in 755. As illustrated in this example, in some embodiments, a subsequent operation of a thread to read the shared counter may do so by reading the stored update probability and computing the projected value of the shared counter dependent on the stored update probability and the desired accuracy percentage, as in 760.

In some embodiments of the probabilistic counter described above, care may be needed to avoid updating $T_i$ when it becomes too small, as this may cause the properties of the counter to be lost. In particular, it may be noted that, because this approach uses an integer pseudorandom number generator, if an update does not reduce the integer part of the stored threshold, this may not actually affect the probability of an update.

In some embodiments, it has been observed that $T_i - T_{i+1} \geq 1$ at least while $T_i \geq a+1$. Therefore, in some embodiments, the probabilistic counter may be reset when this is no longer true. In other embodiments, an error may be raised in this case, if this is preferable in a given context and/or for a given multithreaded application. In an example in which the choice of a=5000 (e.g., in order to achieve a 1% RSTDV), and using a 32-bit counter, this threshold may be crossed when the projected value is about 0.02% below the MaxInt value. Thus, the probabilistic counter may achieve low relative error and much better scalability, without significantly reducing the range of the implemented counter, when compared to naïve 32-bit counters.

In some embodiments, the probabilistic counter approach described thus far may perform very well when the counter becomes contended and reaches higher values, but it may be significantly slower than a standard CAS-based counter when contention is low and the projected counter value is low. In some embodiments, a hybrid version of this probabilistic counter (referred to herein as a "prob-adapt" counter) may be employed in which the incrementing operation is dependent on the current, recent, or historical amount of contention for the counter. For example, in some embodiments, this adaptive probabilistic counter may initially respond to requests to increment the counter by incrementing a standard concurrent counter (e.g., using a CAS type instruction), but if the CAS operation fails multiple times (e.g., according to a pre-determined retry limit or other contention management policy) it may switch to the probabilistic counting scheme described above. For example, in one embodiment the probabilistic counter structure may store a standard counter in one half of a 64-bit word, and a probabilistic counter in the other half. When contention is encountered, the increment operation may switch from updating the standard counter portion of the structure to updating the probabilistic counter portion. In this example, reading the counter may include adding the value projected by the probabilistic counter portion of the counter structure to the value stored by the standard counter portion of the structure. This adaptive approach may be especially well suited for use in multithreaded applications that access thousands of counters, only a few of which are often (or ever) contended.

Figure 8:
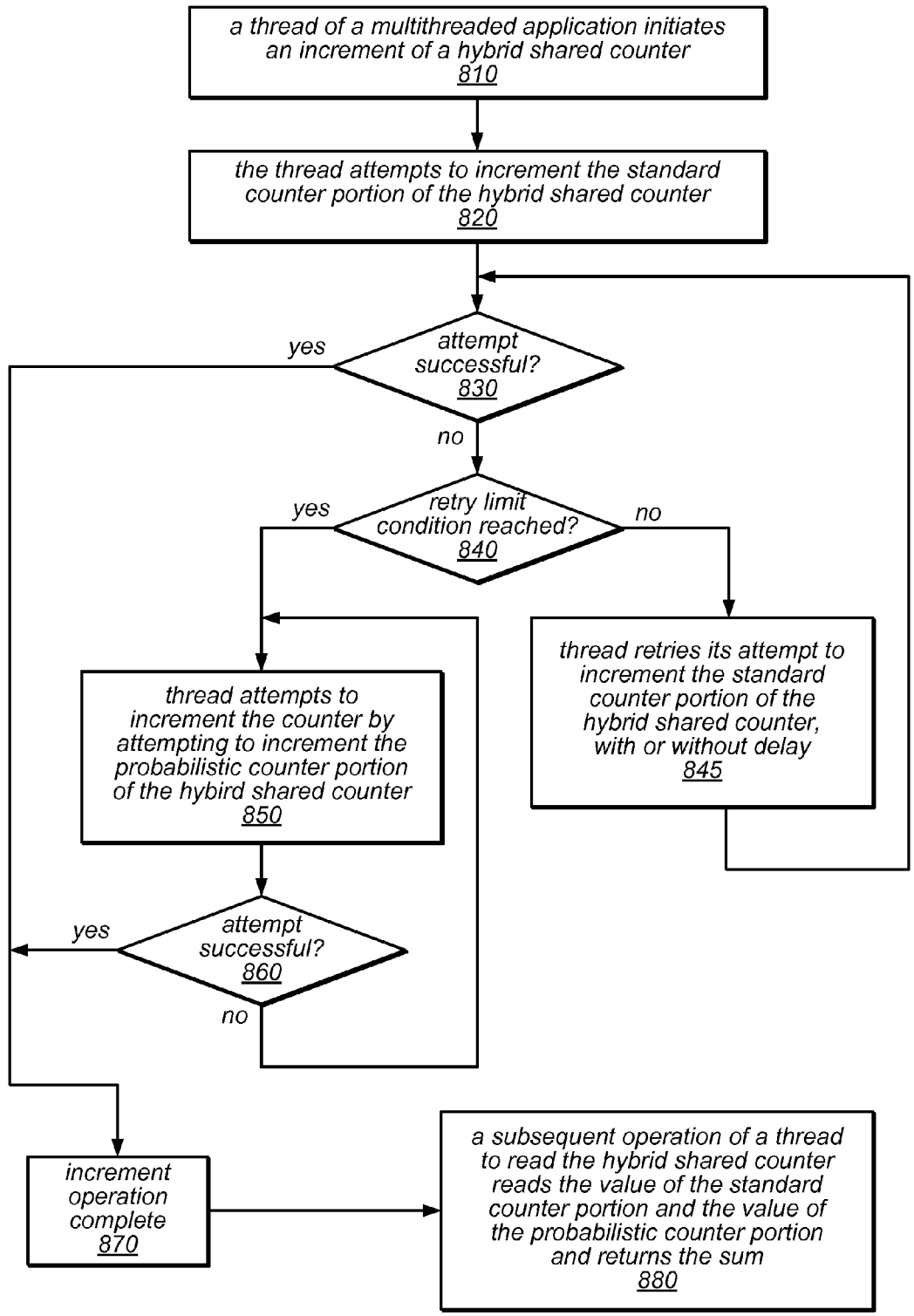
FIG. 8 is a flow diagram illustrating a method for incrementing a hybrid counter dependent on contention for the counter, according to one embodiment.

One embodiment of a method for incrementing a hybrid counter dependent on contention for the counter is illustrated by the flow diagram in FIG. 8. As illustrated at 810, in this example, the method may include a thread of a multithreaded application initiating an increment of a hybrid shared counter (e.g., one that includes a standard counter portion and a probabilistic counter portion). Note that in this and other examples, a thread that initiates an increment of a shared counter may be one of multiple threads that collectively represent multiple concurrently executing atomic transactions, and the shared counter may be accessed from within one or more of these transactions. The method may also include the thread attempting to increment the standard counter portion of the shared counter, as in 820 (e.g., using a CAS type operation or a similar synchronization operation). If the attempt is successful (shown as the positive exit from 830), the increment operation may be complete, as in 870. If the attempt to increment the standard counter portion of the hybrid shared counter is not successful (shown as the negative exit from 830), but a retry limit condition has not yet been reached (shown as the negative exit from 840), the method may include the thread retrying its attempt to increment the standard counter portion of the shared counter one or more times, with or without delay, as in 845, and determining whether these attempts are successful (shown as the feedback from 845 to 830). Note that in various embodiments, the retry limit condition may be that one or more previous CAS type operations have failed to increment the standard portion of the counter and/or one or more other factors that indicate contention on the shared counter.

If an attempt to increment the standard counter portion of the hybrid shared counter is not successful (shown as the negative exit from 830), and the retry limit condition has been reached (shown as the positive exit from 840), the method may include the thread attempting to increment the hybrid shared counter by attempting to increment the probabilistic counter portion of the shared counter (as in 850). If this attempt is not successful (shown as the negative exit from 860), the method may include the thread repeating its attempt to increment the probabilistic counter portion of the hybrid shared counter until it is successful (or until the attempt is aborted due to various applicable retry or contention management policies—not shown). This is illustrated in FIG. 8 by the feedback from 860 to 850. If an attempt to increment the probabilistic counter portion of the hybrid shared counter is successful (shown as the positive exit from 860), the increment operation may be complete, as in 870. As illustrated in this example, in some embodiments, a subsequent operation of a thread to read the hybrid shared counter may do so by reading the value of the standard counter portion and the value of the probabilistic counter portion and returning the sum, as in 880.

The probabilistic counters described above may be suitable for use in many contexts and for many types of multithreaded applications in terms of their accuracy, performance under low contention, scalability under higher contention, and space usage. However, in other contexts, probabilistic counters that provide similar properties without using floating point operations may be more suitable. Therefore, in some embodiments, the update probabilities may be constrained to always be non-positive powers of two. This may make it relatively easy to decide (with the appropriate probability) whether to update the counter, and if so, to compute the next update probability, without using any floating point operations. Two such counters are described below (along with corresponding increment and read operations).

In embodiments in which only non-positive powers of two are used for update probabilities, in response to a request to increment the counter, the increment operation may decide whether to update the counter with probability $1/2^k$ by determining whether the low-order k bits of an integer random number are all zero (without the need to perform any floating point computations). Note that this approach employs coarser-grained update probabilities than the approach described above, since each update can only halve the update probability, in contrast to reducing it by a factor of a/(a+1). Reducing the update probability is important for performance and scalability (at least up to a point). However, if the update probability is halved after every update, it may become small too quickly, which may reduce the accuracy of the counter. Therefore, in some embodiments, the same update probability may be used repeatedly before eventually reducing it, according to various policies for managing this tradeoff, examples of which are described herein.

In the examples described below, counter values may be represented using binary floating point (BFP). For example, the counters may store a pair (m, e), which represents a projected value $m*2^e$ (i.e., m is the mantissa, and e is the exponent). Different bit fields in the counter variable are used to store m and e. For example, if four bits are used to store a value for e and 28 bits are used to store a value for m, the counter structure can represent a counter value of up to $(2^{28}-1)*2^{15}$, or about 2K times MaxInt.

In the examples described below, when the exponent is e, the counter may be updated with probability $2^{-e}$. As in the previous examples, in order to keep the expected projected value of the counter equal to the total number of increments performed to date, $2^e$ may be added to the projected value when incrementing the counter with probability $2^{-e}$. Note that in various embodiments, $2^e$ may be added to the projected value of a counter represented by (m, e) in at least two different ways. For example, one way is to update the stored value to (m+1, e). Another way, which may be applied only when m is odd and the exponent field is not saturated, is to update the counter to ((m+1)/2, e+1). In both cases, the amount added to the projected value is easily seen to be $2^e$. The embodiments described below based on this general approach may differ in one or more policies that control which method to use when updating the counter.

Figure 9:
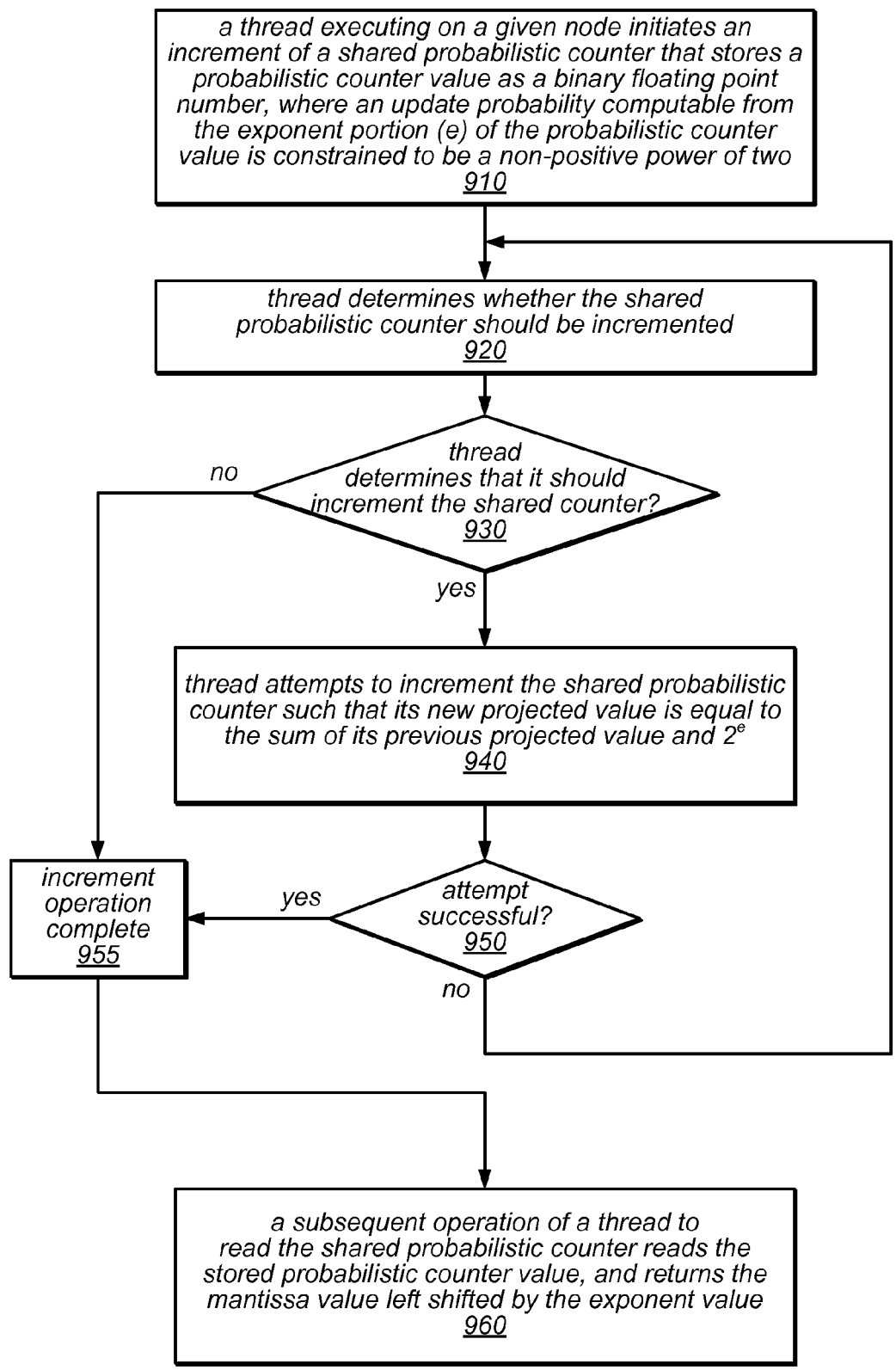
FIG. 9 is a flow diagram illustrating a method for incrementing a probabilistic counter that stores a binary floating point value, according to one embodiment.

One embodiment of a method for incrementing a probabilistic counter that stores a binary floating point value is illustrated by the flow diagram in FIG. 9. As illustrated at 910, in this example, the method may include a thread executing on a given node initiating an increment of a shared probabilistic counter that stores a probabilistic counter value as a binary floating point number, where the update probability is computable from the exponent portion of the probabilistic counter value and is constrained to be a non-positive power of two. For example, in some embodiments, the counter structure may include a mantissa portion and an exponent portion, which together are used to represent a projected (or expected) value of $m*2^e$. The method may also include the thread determining whether the shared probabilistic counter should be incremented (as in 920). For example, the shared probabilistic counter may be updated with probability $1/2^e$, in some embodiments.

In this example, if the thread determines that it should not increment the shared probabilistic counter (shown as the negative exit from 930), the increment operation may be complete (i.e., without incrementing the shared probabilistic counter), as in 955. On the other hand, if the thread determines that it should increment the shared probabilistic counter (shown as the positive exit from 930), the method may include the thread attempting to increment the counter by attempting to store a new value in the shared probabilistic counter such that its new projected value is equal to the sum of its previous projected value and $2^e$, as in 940. For example, attempts to increment the counter may be performed using a CAS type operation with or without back-off. Note that incrementing the counter in this way (e.g., by replacing (m,e) with ((m+1)/2, e+1)) reduces the probability of updating the counter by half. If the attempt to increment the shared probabilistic counter is successful (shown as the positive exit from 950), the increment operation may be complete (as in 955). If the attempt to increment the shared probabilistic counter is not successful (shown as the negative exit from 950), the method may include repeating the attempt to increment the shared probabilistic counter one or more times until it is successful (or until the attempt is aborted due to various applicable retry or contention management policies—not shown). Note that, in this example, repeating the attempt to increment the stored probabilistic counter may include repeating the determination of whether (or not) to perform the increment. This is illustrated in FIG. 9 by the feedback from 950 to 920). As illustrated in this example, in some embodiments, a subsequent operation of a thread to read the shared probabilistic counter may do so by reading the stored probabilistic counter value and computing the projected value (i.e., returning the mantissa value left shifted by the exponent value, in this example), as in 960. Note that, in this example, this is equivalent to computing $m*2^e$.

In some embodiments, a probabilistic counter that stores a probabilistic counter value as a binary floating point number, where an update probability is computable from the exponent portion of the probabilistic counter value, may employ a deterministic update policy. One example of such a counter (referred to herein as a BFP-DUP counter) may exhibit properties similar to those of the probabilistic counters described above, e.g., that a desired bound on the RSTDV may be specified, and that the corresponding update operations may reduce update probabilities as quickly as possible in order to improve scalability while ensuring the desired RSTDV bound. In some embodiments, ensuring the specified bound may involve ensuring that the update probability is not reduced too quickly. In some embodiments, the update policy may cause updates to the counter to increment the mantissa by default. However, if incrementing the mantissa would cause it to reach a predetermined limit (referred to herein as the "mantissa-threshold"), which may be required to be an even number, the increment operation may instead halve the mantissa (after incrementing it) and increment the exponent. Using this approach, the first mantissa-threshold number of increments may update the counter with probability $2^0=1$, thus ensuring that the counter reaches the mantissa-threshold value without introducing any error. Thereafter, the exponent may be incremented (and the mantissa halved) every mantissa-threshold/2 times that the counter is updated. In some embodiments, the choice of the mantissa-threshold value may determine how quickly the exponent grows (and thus how quickly the update probability is reduced). Various methods for choosing the mantissa-threshold value are described herein.

One embodiment of a BFP-DUP counter, as described above, may be illustrated by the example pseudo code presented below.

```
1   // Accuracy is given as number of percents for RSTDV
2   //
3   template <int Accuracy>
4   class BFPCounter {
5   private :
6     // BFP Counter type: 4 bits for the exponent,
7     // 28 bits for the mantissa .
8     //
9     struct Counter {
10      int mantissa : 28;
11      int exp: 4;
12      enum {MaxExp = (1<<4) – 1, MaxMantissa = (1<<28) – 1};
13    };
15    Counter bfpData;
17    enum {
18      MantissaThreshold = 2*((30000/(Accuracy_Accuracy) + 3)/8)
19    };
21  public:
23    BFPCounter( ) {
24      bfpData = {0,0};
25    }
27    // Note: represented value could be larger than MaxInt,
28    // so use 64bit return value
29    //
30    unsigned long long GetVal( ) {
31      Counter data = bfpData;
32      return (unsigned long long)( data . mantissa << data.exp);
33    }
35    void Inc ( ) {
36      int r = rand ( );
37      int numFailures = 0;
38      while (true) {
39        ExpBackoff(numFailures);
40        Counter oldData = bfpData;
41        int e = oldData.exp;
42        int m = oldData. mantissa ;
44        // Choose to update the counter with probability 1/2^e
45        //
46        if (( r & ((1<<e)–1)) != 0) return;
48        // The assumption is that the mantissa field is large enough to
49        // hold MantissaThreshold–1, so do not check for mantissa
50        // overflow unless the exponent is saturated.
51        //
52        bool overflow = (e == Counter::MaxExp &&
53                m == Counter::MaxMantissa);
54        Counter newData = {0,0};
55        if (! overflow) {
56          if ((m == MantissaThreshold – 1) &&
57              (e < Counter::MaxExp)) {
58            newData = {e+1, (m+1)>>1};
59          } else {
60            newData = {e, m+1};
61          }
62        }
63        if (CAS(&bfpData, oldData, newData) == oldDdata) return;
64        numFailures++;
65      }
66    }
```

Figure 10:
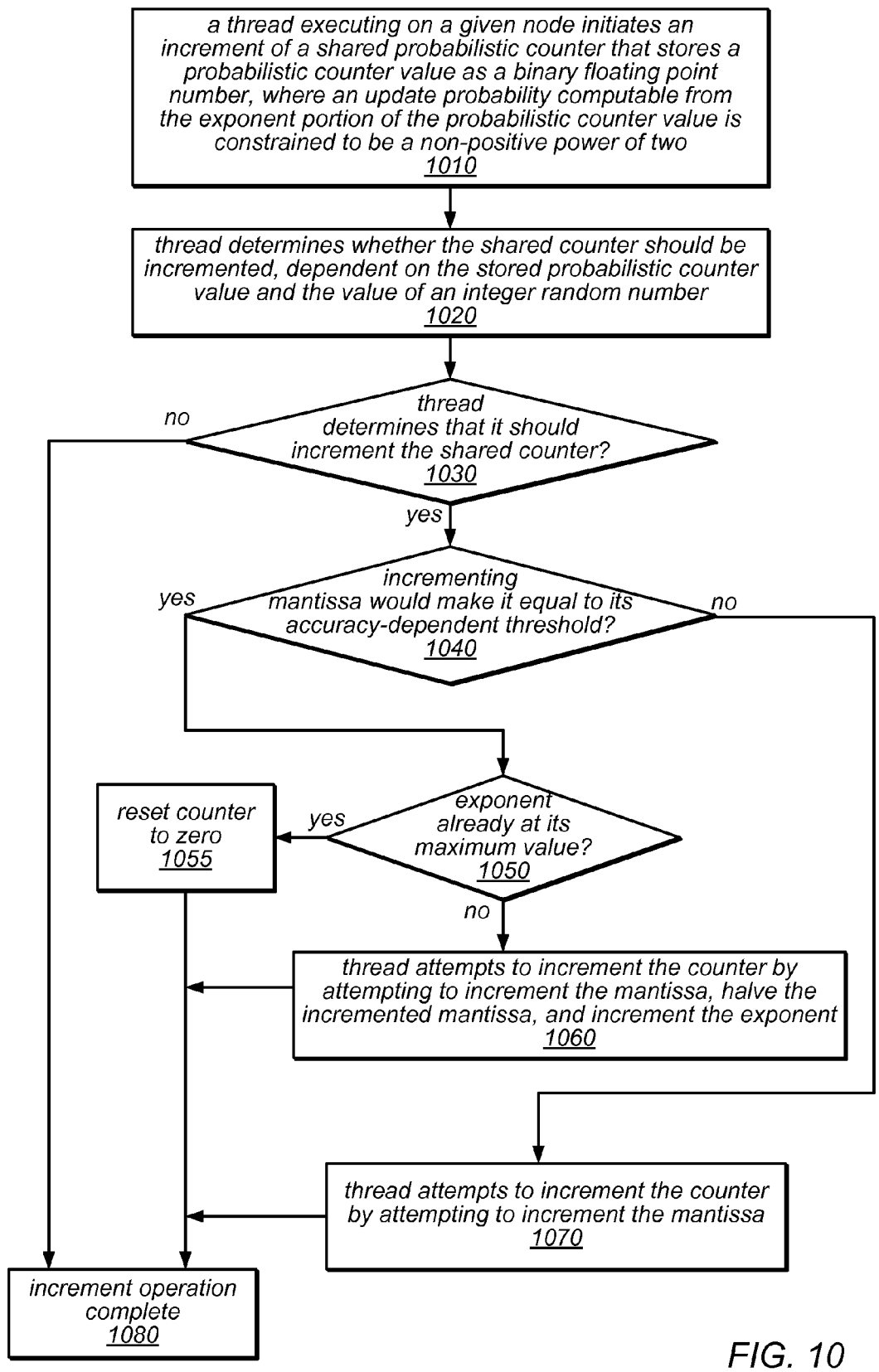
FIG. 10 is a flow diagram illustrating a method for incrementing a probabilistic counter that includes multiple update options, according to one embodiment.

One embodiment of a method for incrementing a probabilistic counter that includes multiple update options is illustrated by the flow diagram in FIG. 10. As illustrated at 1010, in this example, the method may include a thread executing on a given node initiating an increment of a shared probabilistic counter that stores a probabilistic counter value as a binary floating point number, where an update probability computable from the exponent portion of the probabilistic counter value is constrained to be a non-positive power of two. For example, in some embodiments, the counter structure may include a mantissa portion and an exponent portion that together represent a projected (expected) value of $m*2^e$.

The method may also include the thread determining whether the shared probabilistic counter should be incremented, dependent on the stored probabilistic counter value and the value of an integer random number (as in 1020). For example, in one embodiment, to update the counter with probability $1/2^e$, the method may include determining whether the low-order e bits of an integer random number are all zero (with no floating point math necessary). If so, updating the counter in the manner described here may reduce the probability of updating the counter by half. In some embodiments, the method used to perform the updating of the counter may be dependent on whether the mantissa portion of the counter would overflow if it is incremented and/or whether the exponent portion of the counter is saturated.

As illustrated in this example, if the thread determines that it should not increment the shared probabilistic counter (shown as the negative exit from 1030), the increment operation may be complete (i.e., without incrementing the shared probabilistic counter), as in 1080. On the other hand, if the thread determines that it should increment the shared probabilistic counter (shown as the positive exit from 1030), and if incrementing the mantissa would not make it equal to its accuracy-dependent threshold (shown as the negative exit from 1040), the method may include the thread attempting to increment the counter by attempting to increment the mantissa portion of the shared counter (as in 1070), at which point the increment operation may be complete (as in 1080). In some embodiments, attempting to increment the mantissa portion of the shared counter may be performing using a CAS type operation (or a similar synchronization operation) one or more times until it is successful (or until aborted due to various applicable retry or contention management policies), with or without an intervening back-off period (not shown). As in other examples, if the attempt to increment the mantissa portion of the shared counter fails, the method may include repeating at least some of the operations shown in FIG. 10 beginning with element 1020 (not shown).

As illustrated in this example, if the thread determines that it should increment the shared probabilistic counter (shown as the positive exit from 1030), but incrementing the mantissa would make it equal to its accuracy-dependent threshold (shown as the positive exit from 1040), and the exponent portion of the shared probabilistic counter is already at its maximum value (shown as the positive exit from 1050), the method may include the thread resetting the counter to zero (as in 1055), at which point the increment operation may be complete (as in 1080). In other words, the method may include resetting the (mantissa, exponent) pair to a value of (0,0). If incrementing the mantissa would make it equal to its accuracy-dependent threshold (shown as the positive exit from 1040), but the exponent portion of the shared probabilistic counter is not already at its maximum value (shown as the negative exit from 1050), the method may include the thread attempting to increment the counter by attempting to increment the mantissa, halve the incremented mantissa, and increment the exponent (as in 1060), after which the increment operation may be complete (as in 1080). In some embodiments, attempts to update the shared counter may be performed using a single CAS type operation or a similar synchronization operation, which may be repeated (if necessary) until it is successful (or until the attempt is aborted due to various applicable retry or contention management policies—not shown). As in other examples, if the attempt to update the shared counter fails, the method may include repeating at least some of the operations shown in FIG. 10 beginning with element 1020 (not shown).

As illustrated in the example pseudo code above, the BFP-Counter class may in some embodiments accept (as a template argument) the desired bound on RSTDV as a percentage (e.g., an accuracy parameter value of 1 may correspond to a desired bound on RSTDV of 1%). In some embodiments, the value of the mantissa-threshold parameter may be determined based on the desired accuracy, as explained below. In this example, the increment operation (shown as Inc) may decide with probability $1-1/2^e$ not to update the counter, where e is the exponent value currently stored in the counter (as in lines 36-46 of the pseudo code above). In this example, if the decision is made to update the counter, the increment operation may first check to see whether the counter has already reached its maximum value (as in line 52), in which case it may attempt to update the counter to zero. Note that in other embodiments, the increment operation may instead signal an error in this case, e.g., if that is preferable in a given context or for a given application. Otherwise, a new pair may be determined based on the current pair (as shown in lines 56-61 above). Finally, the increment operation may attempt to store the new pair to the counter, e.g., using a CAS type instruction to confirm that the counter has not already changed (as in line 63). In this example, if the CAS operation fails, the operation may be retried, beginning with a determination of whether (or not) to update the counter. In other embodiments, other contention management policies may be applied.

In some embodiments, various optimizations of the increment operations described herein may improve overall performance. For example, in some embodiments, the code implementing the increment operation may "inline" the common update case (i.e., the case in which the CAS type operation to update the counter succeeds), and may use the return value of a failed CAS type operation to avoid the need to re-read the counter data (e.g., bfpData, in the example code above) before retrying the increment operation. In some embodiments, when a CAS type operation fails due to a conflict with a concurrent update (e.g., an update being attempted by another thread of the same multithreaded application), the test to determine whether an update should be applied based on the new value may be performed before backing off, as this will almost never be the case. In some embodiments, all of the calculations described above for this counter may be performed using bit shifting and masking operations (i.e., without floating point operations).

Note that an existing sequential approximate counting algorithm that is similar to that described above does not support concurrent updates, and is less flexible than the approach described above. In this existing algorithm, rather than explicitly updating the mantissa and exponent whenever the counter is updated, an update is performed simply by incrementing the stored value. In this existing algorithm, when the mantissa part of the counter is incremented past its maximum value, the overflow may naturally increment the exponent field (which may be placed appropriately to ensure this). As a result of this choice, the update function used the existing algorithm may be somewhat simpler than the one described above. However, this may have little performance impact because the counter is updated less and less frequently over time. Another implication of the existing algorithm is that the frequency with which an update increments the exponent (and thus reduces the update probability for subsequent operations) is required to be a power of two. Furthermore, the existing algorithm must implement a different way of computing the projected value from the data stored in the counter, because the mantissa part of the stored data becomes zero when the exponent is incremented.

In some embodiments, the BFP-DUP counter described herein may perform twice as many increments to the mantissa before incrementing the exponent for the first time as it does between subsequent increments of the exponent, whereas the existing algorithm performs the same number of increments to the mantissa before each increment of the exponent. As a result, the Markov chain used to model the BFP-DUP counter includes a deterministic chain of length mantissa-threshold/2 before a chain that is otherwise similar to the one used by the existing algorithm. Note, however, that this may not change the result in the limit, because these deterministic increments of the mantissa occur with probability 1, and therefore do not increase the inaccuracy of the counter.

In contrast to the operations associated with the prob-adapt counter described above, the bound on RSTDV, in this BFP-DUP counter, may not be independent of the number of increment operations performed. Rather, these techniques may provide a bound on expected RSTDV in the limit as the number of increments n approaches infinity. More precisely, this may be described as follows:

$$\lim_{n \to \infty} \sup A_n \le \sqrt{\frac{3}{8M - 3}}$$

In this example, $A_n$ represents the expected RSTDV after n increment operations, and M represents the number of increments of the mantissa between increments of the exponent (which, in this example, is equal to mantissa-threshold/2). In some embodiments, this formula may be used to determine a choice of M in order to achieve a desired bound. For example, because the BFPCounter class in the pseudo code above accepts its accuracy argument as a percentage (as described above)), the equation above may imply the following:

$$M \le ((30{,}000/\text{Accuracy}^2)+3)/8$$

In this example, the corresponding formula for the mantissa-threshold value is found at line 18 of the pseudo code above (and the mantissa-threshold=2M). Note that in some embodiments, because the BFP-DUP counter does not constrain the number of increments to the mantissa between increments of the exponent to be a power of two, the use of this approach may provide the flexibility to choose the mantissa-threshold value based on this calculation, resulting in finer-grained control over the accuracy-performance tradeoff. In some embodiments, (including those modeled in various experiments described herein), the accuracy parameter value was set to reflect a 1% bound on RSTDV, resulting in the mantissa-threshold being set to 7500.

Figure 11:
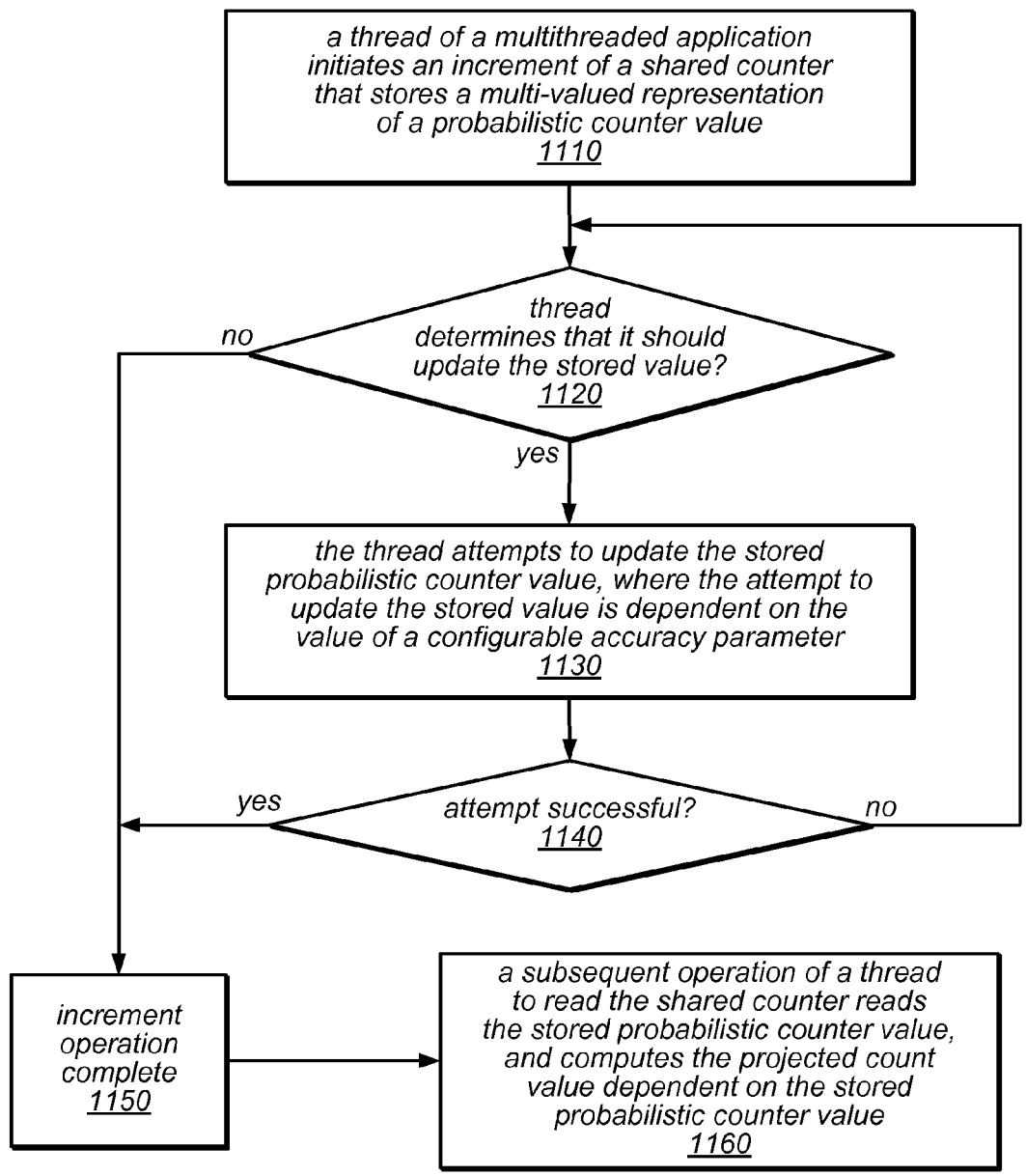
FIG. 11 is a flow diagram illustrating a method for incrementing a probabilistic counter dependent on a configurable accuracy parameter, according to one embodiment.

One embodiment of a method for incrementing a probabilistic counter dependent on a configurable accuracy parameter is illustrated by the flow diagram in FIG. 11. As illustrated at 1110, in this example, the method may include a thread of a multithreaded application initiating an increment of a shared counter that stores a multi-valued representation of a probabilistic counter, where the projected count can be computed from the stored probabilistic counter value. If the thread determines that it should update the stored probabilistic counter value (shown as the positive exit from 1120), the method may include the thread attempting to update the stored probabilistic counter value, where the attempt to update the stored probabilistic counter value is dependent on the value of a configurable accuracy parameter (as in 1130). Note that in some embodiments, the attempt to update the stored probabilistic counter (and/or the determination to do so) may also be based on the stored probabilistic counter value itself (i.e. the current stored value).

As illustrated in this example, if the attempt to update the stored probabilistic counter value is successful (shown as the positive exit from 1140), the increment operation may be complete (as in 1150). On the other hand, if the attempt to update the stored probabilistic counter value is not successful (shown as the negative exit from 1140), the method may include repeating the attempt to update the stored probabilistic counter value until it is successful, or until the attempt is aborted due to various applicable retry or contention management policies). Note that, in this example, repeating the attempt to update the stored probabilistic counter may include repeating the determination of whether (or not) to perform the update. This is illustrated in FIG. 11 as the feedback from 1140 to 1120. As illustrated in this example, in some embodiments, a subsequent operation of a thread to read the shared counter may do so by reading the stored probabilistic counter, and computing the projected count value dependent on the stored probabilistic counter value, as in 1160.

In various embodiments, the deterministic update policy used by the BFP-DUP counter may be attractive for use in a variety of contexts and in a variety of multithreaded applications. However, while it is important for scalability and performance to reduce the update probability as the counter grows, at some point for a given system and workload, contention on the counter variable may be reduced to virtually zero, and the overhead of updating the counter occasionally will become unnoticeable. Past this point, reducing the update probability further may serve only to increase the inaccuracy of the counter. Therefore, some embodiments employ adaptive and/or contention-sensitive update policies, such as a contention-sensitive update policy. For example, in some embodiments, the increment operation may choose to update the exponent (thereby reducing the update probability) only when there is (or has been) contention for the counter. In other words, an adaptive BFP counter may employ an increment operation that is dependent on the current, recent, or historical amount of contention for the counter. For example, in some embodiments the increment operation may first attempt to increment the mantissa (e.g., unconditionally, or unless it would overflow) once (or another pre-determined number of times) using a CAS type instruction, and only if that fails, may decide whether to update the exponent and halve the mantissa using a policy similar to that used in the BFP-DUP counter described above. A BFP counter that employs such a contention-sensitive update policy may be referred to herein as a BFP-CSUP counter. In various experiments, it has been shown that a BFP-CSUP counter may yield performance that is similar to that of the BFP-DUP counters described above, while achieving higher accuracy in practice.

Figure 12:
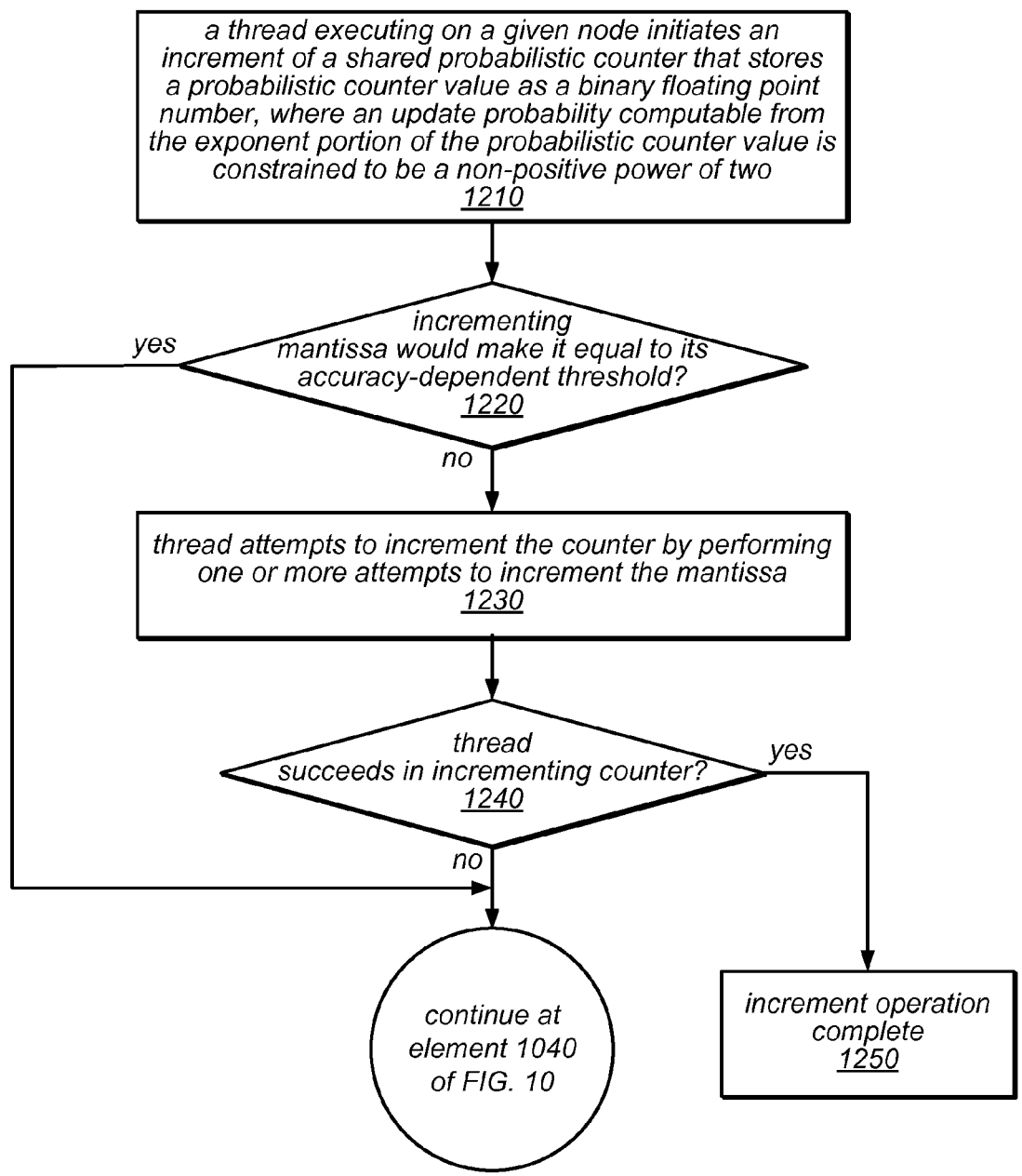
FIG. 12 is a flow diagram illustrating a method for incrementing a probabilistic counter that stores a floating point value dependent on contention for the shared counter, according to one embodiment.

One embodiment of a method for incrementing a probabilistic counter that stores a binary floating point value that represents a counter's value dependent on contention for the shared counter is illustrated by the flow diagram in FIG. 12. As illustrated at 1210, in this example, the method may include a thread executing on a given node initiating an increment of a shared probabilistic counter that stores a probabilistic counter value as a binary floating point number, where an update probability computable from the exponent portion of the probabilistic counter value is constrained to be a non-positive power of two. For example, in some embodiments, the counter structure may include a mantissa portion and an exponent portion, which together represent a projected (expected) value of $m*2^e$. If incrementing the mantissa portion of the counter would make its value equal to its accuracy-dependent threshold (shown as the positive exit from 1220), the method may include continuing the attempt to increment the shared probabilistic counter as in the method illustrated in FIG. 10, beginning with element 1040.

As illustrated in this example, if incrementing the mantissa portion of the counter would not make its value equal to its accuracy-dependent threshold (shown as the negative exit from 1220), the method may include the thread attempting to increment the shared probabilistic counter by performing one or more attempts to increment the mantissa (as in 1230). In various embodiments, the number of times the thread may retry its attempt may be dependent on one or more applicable retry or contention management policies, and multiple retry attempts may be performed with or without an intervening back-off period. If the thread succeeds in incrementing the shared probabilistic counter (shown as the positive exit from 1240), the increment operation may be complete (as in 1250). If the thread does not succeed in incrementing the shared probabilistic counter (shown as the negative exit from 1240), the method may include continuing the attempt to increment the shared probabilistic counter as in the method illustrated in FIG. 10, beginning with element 1040.

In different embodiments, a variety of contention-sensitive methods may be applied for determining whether, when, and/or how to update statistics counters based on current, recent, or historic contention. One embodiment of a method for determining whether (and/or when) to increment a shared counter and for incrementing the shared counter dependent on contention for the shared counter is illustrated by the flow diagram in FIG. 13. As illustrated at 1310, in this example, the method may include one of multiple concurrently executing threads of a multithreaded application initiating an increment of a shared counter. In some embodiments, the thread may be one of multiple threads that collectively implement multiple concurrently executing atomic transactions. The method may include the thread determining whether or when to update the shared counter, where the method for determining whether or when to update the shared counter is dependent on an amount of contention on the shared counter between the concurrently executing threads (as in 1320). For example, the method may be dependent, at least in part, on current, recent, or historic contention for the shared counter.

Figure 13:
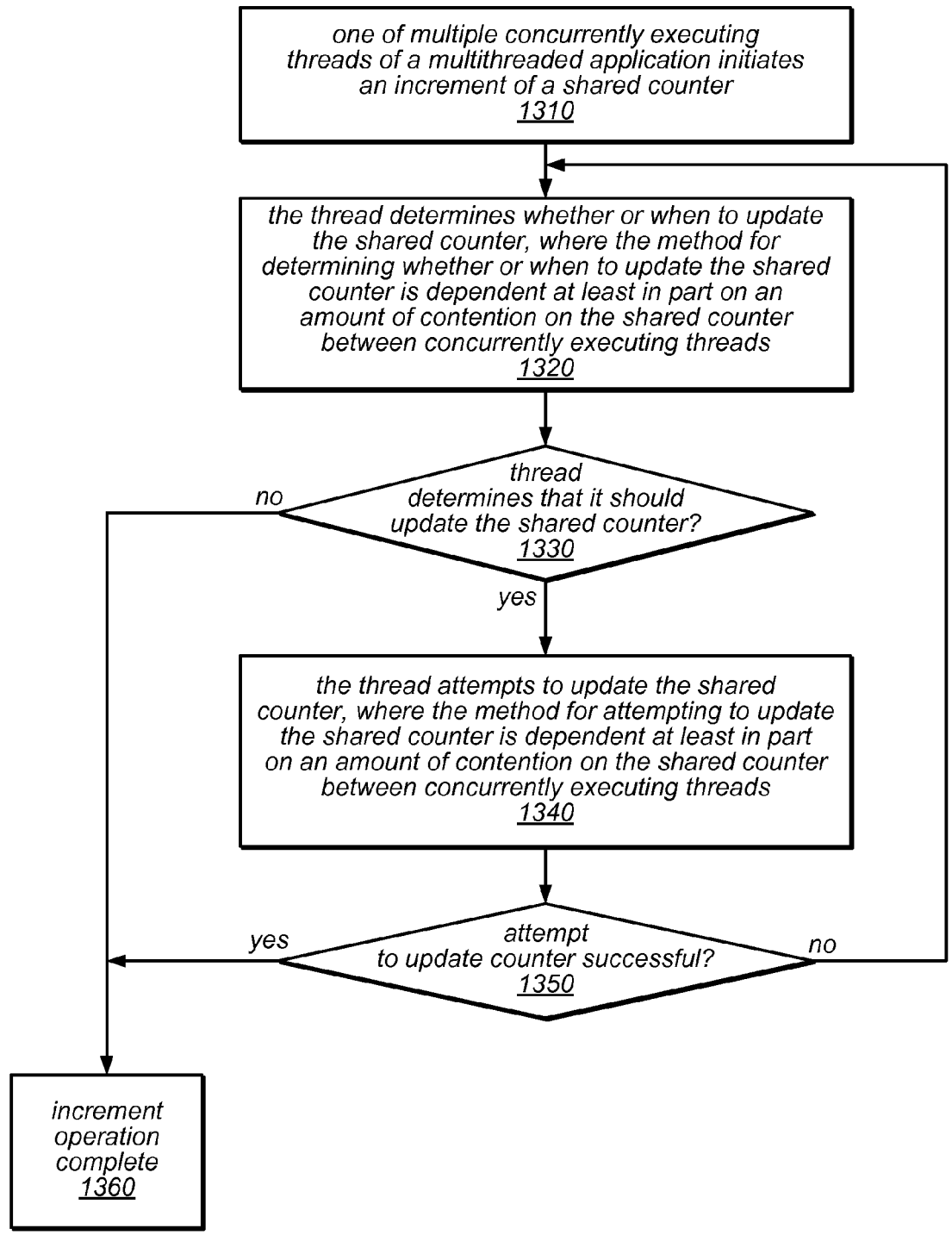
FIG. 13 is a flow diagram illustrating a method for determining whether to increment a shared counter and for incrementing the shared counter dependent on contention for the shared counter, according to one embodiment.

If the thread determines that it should not update the shared counter (shown as the negative exit from 1330), the increment operation may be complete (i.e., without updating the shared counter), as in 1360. On the other hand, if the thread determines that it should update the shared counter (shown as the positive exit from 1330), the method may include the thread attempting to update the shared counter, where the method for attempting to update the shared counter is dependent on an amount of contention on the shared counter between concurrently executing threads (as in 1340). Again, the method may be dependent, at least in part, on current, recent, or historic contention for the shared counter. As illustrated in this example, if the attempt to update the shared counter is successful (shown as the positive exit from 1350), the increment operation may be complete (as in 1360). On the other hand, if the attempt to update the shared counter is not successful (shown as the negative exit from 1350), the method may include the thread retrying its attempt to update the shared counter one or more times until it is successful (or until the attempt is aborted due to various applicable retry or contention management policies—not shown). Note that, in this example, repeating the attempt to update the shared counter may include repeating the determination of whether (or not) or when to update the counter. This is illustrated in FIG. 13 by the feedback from 1350 to 1320. Note that in some embodiments, the performance of a retry attempt (and/or the number of times that an attempt may be retried) may also be dependent on the amount of contention on the counter (including contention that may have caused this most recent failure). Note also that, while in the example illustrated in FIG. 13, both the operation illustrated in 1320 and the operation illustrated in 1340 are described as being dependent on an amount of contention on the counter, in other embodiments, only one of these operations may be dependent on a current, recent, or historic amount of contention on the counter.

The examples described herein have been largely focused on techniques for implementing statistics counters for use in contexts in which there may be many counters, some of which may be incremented frequently. Therefore, the examples have included techniques that exhibit low space overhead, low overhead in the absence of contention, and good scalability under heavy contention. Although these techniques have not necessarily been optimized for read performance (e.g., for read operations that target the counters), in some embodiments the costs associated with these read operations may be reasonably low for most of the techniques described herein.

Note that, in general, there may be two primary components of the cost of retrieving the value of a counter. One component is the cost associated with the cost of reading the necessary data, and the other component is the cost associated with computing a return value from the data that is read. In many of the scenarios described herein, the first of these costs is likely to dominate the cost of retrieving the count value associated with a given counter, because the data underlying the counter is likely not to be in cache for the thread executing the read operation. Therefore, the data may need to be fetched from memory, or from another cache, which may be on a different NUMA node in the system.

Note that reading the value of existing naïve counters may simply involve reading the data stored in the counter itself and returning the value that was read. Hence, their read costs are (at most) the cost of a single cache miss. In some embodiments, the NUMA-aware RBO type counters or adaptive NUMA-aware RBO type counters described herein, or the counters that employ the approaches referred to herein as BFP-DUP and BFP-CSUP, may also incur the cost of a single cache miss, but these counters may also incur the costs of various masking and/or shifting operations to determine the counter's projected value. Reading the multiline counter described herein may require that each of the cache lines underlying the counter be read. However, these may be independent reads, so the cache misses may be resolved largely in parallel on most modern architectures. Read operations on counters that employ the multiline-adapt approach described herein may be similar to those of existing simple counters unless the counter experiences sufficient update contention to be inflated, in which case the read operation must read not only the multiple cache lines allocated for the counter, but also the pointer that determines where they are. The read operations of the allocated cache lines depend on the value of the pointer, and therefore the latency of the read operation may be likely to include the cost of at least two cache misses in series, even if all of the allocated lines are read in parallel. Read operations targeting the Morris and "prob-adapt" counters may both include multiple floating point operations that are likely to add noticeable overhead if executed frequently. The BFP-based counters may therefore be preferable in such scenarios. Alternatively, optimizations that record the projected value calculated from a stored value may be worthwhile, given that (eventually) the stored value of a counter may change only infrequently (e.g., after the update probability has been sufficiently reduced).

In some embodiments, the scalable statistics counters described herein may be especially valuable when used in systems that include transactional memory support, whether that transactional memory support is implemented in hardware, in software, or using a combination of both hardware and software. For example, statistics counters may be used for a variety of purposes in such systems, such as recording the number of entries in a hash table, or maintaining statistics about how often a certain piece of code is executed. A common experience has been that the use of counters within atomic transactions causes all pairs of transactions to conflict because they all update the counter. As described herein, counters may in some embodiments be made more scalable by reducing contention on them, either by splitting them up so that multiple updates can occur in parallel (as in the multiline approach described above) or by reducing the frequency of updates (as in the probabilistic counters described herein). In some embodiments, these techniques may have the side effect of significantly reducing how often atomic transactions using these counters would conflict with each other, as compared to transactions that employ naïve non-scalable counters, which typically scale poorly and/or yield highly inaccurate counts.

In various embodiments, a variety of counter techniques (some of which provide a precise count, and others of which aim for reasonable relative error, such that they are still useful for the purpose of detecting count values that are incremented many times) may yield better results in terms of scalability and/or accuracy than naïve concurrent counters. Several of the counters described herein may dramatically outperform commonly used statistics counters in terms of both throughput and accuracy, especially in NUMA systems, while keeping space overhead low.

Many of the counter techniques described herein are easily seen to be lock-free. Furthermore, when employing the probabilistic counter techniques described herein, the need to retry attempts to increment a counter may become less likely over time because the update probability for the counter becomes smaller over time (particularly when there is contention for a counter that employs the BFP-CSUP techniques described above). In some embodiments, the counters described herein may be modified such that they are wait-free, which in some cases may add overhead and/or complexity. Modifying the counters to be wait-free may also introduce additional constraints (such as a need to know the maximum number of threads in advance), or may result in a need for more overhead and complexity to avoid such constraints. However, in practice, lock-freedom may in some embodiments be a strong enough property to ensure progress for concurrent threads of a multithreaded application, provided that some type of back-off scheme can be applied when there is contention for the counter.

Figure 14:
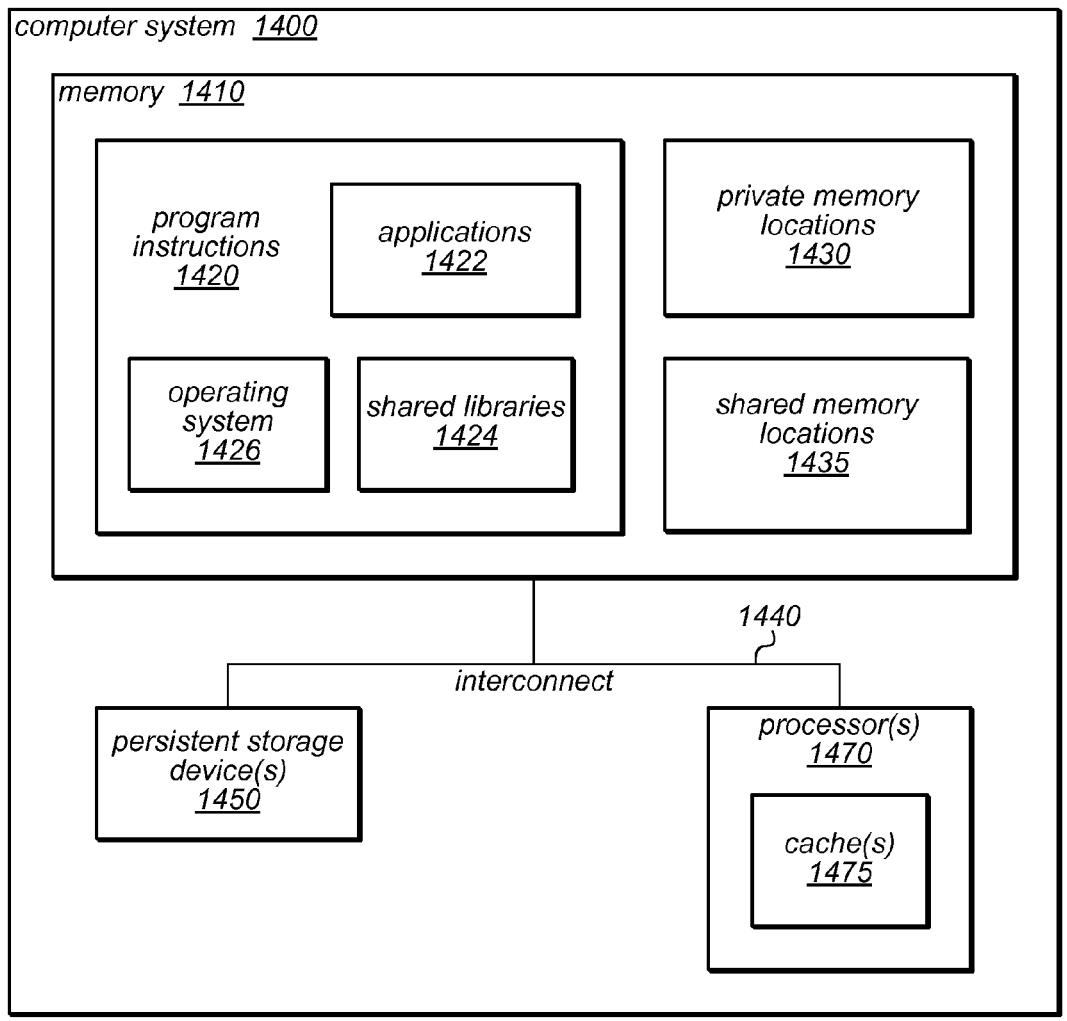
FIG. 14 is a block diagram illustrating one embodiment of a computing system configured to implement one or more of the shared counters described herein.

FIG. 14 illustrates a computing system configured to implement the methods described herein, according to various embodiments. The computer system 1400 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device. In some embodiments, computer system 1400 may be one of a plurality of nodes in a system that employs a NUMA style memory architecture and/or NUCA properties, or in general any type of computing node that includes at least one processor core that is coupled to some type of memory (e.g., cache, local memory, remote memory, etc.).

The mechanisms for implementing any or all of the scalable statistics counters described herein, may be provided as a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1400 may include one or more processors 1470; each may include multiple cores, any of which may be single or multi-threaded. For example, as illustrated in FIG. 2, multiple processor cores may included in a single processor chip (e.g., a single processor 1470), and multiple processor chips may be included on a CPU board, two or more of which may be included in computer system 1400. Each of the processors 1470 may include a hierarchy of caches, in various embodiments. For example, as illustrated in FIG. 2, each processor chip 1470 may include multiple L1 caches (e.g., one per processor core) and a single L2 cache (which may be shared by the processor cores on the processor chip). The computer system 1400 may also include one or more persistent storage devices 1450 (e.g. optical storage, magnetic storage, hard drive, tape drive, solid state memory, etc) and one or more system memories 1410 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 14 (e.g., video cards, audio cards, additional network interfaces, peripheral devices, a network interface such as an ATM interface, an Ethernet interface, a Frame Relay interface, etc.)

The one or more processors 1470, the storage device(s) 1450, and the system memory 1410 may be coupled to the system interconnect 1440. One or more of the system memories 1410 may contain program instructions 1420. Program instructions 1420 may be executable to implement one or more applications 1422 (which may include one or more accesses to a shared statistics counter, as described herein), shared libraries 1424, or operating systems 1426. In some embodiment, program instructions 1420 may be executable to implement a contention manager (not shown). Program instructions 1420 may be encoded in platform native binary, any interpreted language such as Java™ byte-code, or in any other language such as C/C++, Java™, etc or in any combination thereof. The program instructions 1420 may include functions, operations and/or other processes for implementing scalable statistics counters and associated functions (e.g., increment operations and/or read operations that target the scalable statistics counters), as described herein. Such support and functions may exist in one or more of the shared libraries 1424, operating systems 1426, or applications 1422, in various embodiments. The system memory 1410 may further comprise private memory locations 1430 and/or shared memory locations 1435 where data may be stored. For example, shared memory locations 1435 may store data accessible to concurrently executing threads, processes, or atomic transactions, which may include data stored in one or more structures that implement a shared statistics counter (e.g., one of the precise counters or probabilistic counters described herein), in various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A method, comprising:
performing by a plurality of computing nodes, each of which comprises at least one processor core and a memory:
beginning execution of a multithreaded application that comprises one or more operations to increment a shared counter, wherein the shared counter is implemented as a data structure that is accessible by a plurality of threads of the multithreaded application that are executing on the plurality of computing nodes, wherein the data structure comprises a count value portion and a node identifier portion;
initiating, by a given thread of the application, an increment operation targeting the shared counter; and
determining whether to attempt to perform the increment operation or delay performance of the increment operation, wherein said determining is dependent, at least in part, on a value stored in the node identifier portion of the data structure;
wherein the value stored in the node identifier portion of the data structure indicates whether one or more threads on a particular one of the plurality of computing nodes have priority to increment the shared counter or have requested priority to increment the shared counter.

2. The method of claim 1,
wherein the value stored in the node identifier portion of the data structure identifies the particular one of the plurality of computing nodes on which a thread that most recently incremented the shared counter was executing;
wherein increment operations of threads executing on the identified computing node have higher priority than increment operations of threads executing on other ones of the plurality of computing nodes; and
wherein said determining comprises determining whether the value stored in the node identifier portion of the data structure identifies a computing node other than the one on which the given thread is executing.

3. The method of claim 1,
wherein the value stored in the node identifier portion of the data structure identifies the particular one of the plurality of computing nodes on which a thread that has requested priority to increment the shared counter was executing; and
wherein said determining comprises determining whether the value stored in the node identifier portion of the data structure identifies a computing node other than the one on which the given thread is executing.

4. The method of claim 1, wherein attempting to perform the increment operation comprises attempting to increment a value stored in the count value portion of the data structure and to store an identifier of the computing node on which the given thread is executing in the node identifier portion of the data structure using a single atomic operation.

5. The method of claim 4,
wherein said determining comprises determining that the value of the node identifier portion of the data structure indicates that no threads on any of the plurality of computing nodes have priority to increment the shared counter or have requested priority to increment the shared counter; and
wherein said attempting to increment a value stored in the count value portion of the data structure and to store an identifier of the computing node on which the given thread is executing in the node identifier portion of the data structure is performed in response to one or more failed attempts to increment the count value portion of the data structure without writing a value to the node identifier portion of the data structure.

6. The method of claim 1, further comprising:
in response to determining that one or more threads on a particular one of the plurality of computing nodes other than the computing node on which the given thread is executing have priority to increment the shared counter or have requested priority to increment the shared counter:
delaying performance of the increment operation; and
attempting to perform the increment operation subsequent to said delaying.

7. The method of claim 1, further comprising:
attempting to perform the increment operation without a delay in response to determining that threads on the one of the plurality of computing nodes on which the given thread is executing have priority to increment the shared counter or have requested priority to increment the shared counter or that no threads on any of the plurality of computing nodes have priority to increment the shared counter or have requested priority to increment the shared counter.

8. The method of claim 1, further comprising:
in response to determining that the value stored in the node identifier portion of the data structure identifies a computing node other than the one on which the given thread is executing, the given thread storing an identifier of the computing node on which the given thread is executing in an anti-starvation variable to indicate a request for priority to increment the shared counter.

9. The method of claim 8, further comprising:
subsequent to said storing, a thread executing on the computing node on which the given thread is executing attempting to perform an increment operation without delay.

10. The method of claim 1, further comprising:
storing an initial or default value in the node identifier portion of the data structure to indicate that no threads on any of the plurality of computing nodes have priority to increment the shared counter or have requested priority to increment the shared counter;
wherein said storing is performed during an initialization phase of the multithreaded application, periodically, or in response to a decrease in contention for the shared counter.

11. A system comprising:
a plurality of computing nodes, wherein each computing node comprises one or more processor cores that collectively support multithreading and a memory storing program instructions that when executed on the one or more computing nodes cause the one or more computing nodes to perform:
beginning execution of a multithreaded application that comprises one or more operations to increment a shared counter, wherein the shared counter is implemented as a data structure that is accessible by a plurality of threads of the multithreaded application that are executing on the plurality of computing nodes, wherein the data structure comprises a count value portion and a node identifier portion;
initiating, by a given thread of the application, an increment operation targeting the shared counter; and
determining whether to attempt to perform the increment operation or delay performance of the increment operation, wherein said determining is dependent, at least in part, on a value stored in the node identifier portion of the data structure;
wherein the value stored in the node identifier portion of the data structure indicates whether one or more threads on a particular one of the plurality of computing nodes have priority to increment the shared counter or have requested priority to increment the shared counter.

12. The system of claim 11,
wherein the value stored in the node identifier portion of the data structure identifies the particular one of the plurality of computing nodes on which a thread that most recently incremented the shared counter was executing or identifies the particular one of the plurality of computing nodes on which a thread that has requested priority to increment the shared counter was executing;
wherein increment operations of threads executing on the identified computing node have higher priority than increment operations of threads executing on other ones of the plurality of computing nodes; and
wherein said determining comprises determining whether the value stored in the node identifier portion of the data structure identifies a computing node other than the one on which the given thread is executing.

13. The system of claim 11, wherein when executed on the one or more computing nodes, the program instructions further cause the one or more computing nodes to perform:
in response to determining that one or more threads on a particular one of the plurality of computing nodes other than the computing node on which the given thread is executing have priority to increment the shared counter or have requested priority to increment the shared counter:
delaying performance of the increment operation; and
attempting to perform the increment operation subsequent to said delaying.

14. The system of claim 11, wherein when executed on the one or more computing nodes, the program instructions further cause the one or more computing nodes to perform:
attempting to perform the increment operation without a delay in response to determining that threads on the one of the plurality of computing nodes on which the given thread is executing have priority to increment the shared counter or have requested priority to increment the shared counter or that no threads on any of the plurality of computing nodes have priority to increment the shared counter or have requested priority to increment the shared counter.

15. The system of claim 11, wherein when executed on the one or more computing nodes, the program instructions further cause the one or more computing nodes to perform:
in response to determining that the value stored in the node identifier portion of the data structure identifies a computing node other than the one on which the given thread is executing, the given thread storing an identifier of the computing node on which the given thread is executing in an anti-starvation variable to indicate a request for priority to increment the shared counter; and subsequent to said storing, a thread executing on the computing node on which the given thread is executing attempting to perform an increment operation without delay.

16. A non-transitory, computer readable storage medium storing program instructions that when executed on one or more computers cause the one or more computers to perform:

beginning execution of a multithreaded application that comprises one or more operations to increment a shared counter, wherein the shared counter is implemented as a data structure that is accessible by a plurality of threads of the multithreaded application that are executing on a plurality of computing nodes, wherein the data structure comprises a count value portion and a node identifier portion;

initiating, by a given thread of the application, an increment operation targeting the shared counter; and determining whether to attempt to perform the increment operation or delay performance of the increment operation, wherein said determining is dependent, at least in part, on a value stored in the node identifier portion of the data structure;

wherein the value stored in the node identifier portion of the data structure indicates whether one or more threads on a particular one of the plurality of computing nodes have priority to increment the shared counter or have requested priority to increment the shared counter.

17. The non-transitory, computer readable storage medium of claim 16, wherein the value stored in the node identifier portion of the data structure identifies the particular one of the plurality of computing nodes on which a thread that most recently incremented the shared counter was executing or identifies the particular one of the plurality of computing nodes on which a thread that has requested priority to increment the shared counter was executing;

wherein increment operations of threads executing on the identified computing node have higher priority than increment operations of threads executing on other ones of the plurality of computing nodes; and wherein said determining comprises determining whether the value stored in the node identifier portion of the data structure identifies a computing node other than the one on which the given thread is executing.

18. The non-transitory, computer readable storage medium of claim 16, wherein when executed on the one or more computers, the program instructions further cause the one or more computers to perform:

in response to determining that one or more threads on a particular one of the plurality of computing nodes other than the computing node on which the given thread is executing have priority to increment the shared counter or have requested priority to increment the shared counter:

delaying performance of the increment operation; and attempting to perform the increment operation subsequent to said delaying.

19. The non-transitory, computer readable storage medium of claim 16, wherein when executed on the one or more computers, the program instructions further cause the one or more computers to perform:

attempting to perform the increment operation without a delay in response to determining that threads on the one of the plurality of computing nodes on which the given thread is executing have priority to increment the shared counter or have requested priority to increment the shared counter or that no threads on any of the plurality of computing nodes have priority to increment the shared counter or have requested priority to increment the shared counter.

20. The non-transitory, computer readable storage medium of claim 16, wherein when executed on the one or more computers, the program instructions further cause the one or more computers to perform:

in response to determining that the value stored in the node identifier portion of the data structure identifies a computing node other than the one on which the given thread is executing, the given thread storing an identifier of the computing node on which the given thread is executing in an anti-starvation variable to indicate a request for priority to increment the shared counter; and subsequent to said storing, a thread executing on the computing node on which the given thread is executing attempting to perform an increment operation without delay.

* * * * *

UNITED STATES PATENT AND TRADEMARK OFFICE
CERTIFICATE OF CORRECTION

PATENT NO. : 8,918,596 B2  Page 1 of 1
APPLICATION NO. : 13/722817
DATED : December 23, 2014
INVENTOR(S) : Dice et al.

It is certified that error appears in the above-identified patent and that said Letters Patent is hereby corrected as shown below:

On title page 2, column 1, under Other Publications, line 5-8, below "pp. 1-10."
delete ""Hierarchical Backoff Locks for Nonuniform Communication Architectures", Zoran Radovic and Erik Hagersten, Proceedings of the Ninth International Symposium on High-Performance Computer Architecutre, 2002, pp. 1-12.".

In the Drawings,

On sheet 9 of 15, in figure 8, under Reference Numeral 850, line 5, delete "hybird" and insert -- hybrid --, therefor.

In the Specification,

In column 18, line 2, delete "$T_{i+1}=*a/(a+1))$" and insert --$T_{i+1}=T_i*a/(a+1)$ --, therefor.

In column 31, line 25, after "may" insert -- be --.

Signed and Sealed this
Fourth Day of August, 2015

Michelle K. Lee
*Director of the United States Patent and Trademark Office*